United States Patent
Giri et al.

(10) Patent No.: US 12,267,461 B2
(45) Date of Patent: Apr. 1, 2025

(54) METHOD FOR DYNAMICALLY PRIORITIZING INBOUND INTERACTIONS IN A DIGITAL MULTI-CHANNEL CONTACT CENTER

(71) Applicant: NICE LTD., Ra'anana (IL)

(72) Inventors: Pramod Giri, Pune (IN); Salil Dhawan, Pune (IN); Swati Kadu, Pune (IN)

(73) Assignee: NICE LTD., Ra'Anana (IL)

( * ) Notice: Subject to any disclaimer, the term of this patent is extended or adjusted under 35 U.S.C. 154(b) by 129 days.

(21) Appl. No.: 18/226,283

(22) Filed: Jul. 26, 2023

(65) Prior Publication Data

US 2025/0039304 A1 Jan. 30, 2025

(51) Int. Cl.
*H04M 3/523* (2006.01)

(52) U.S. Cl.
CPC .................. *H04M 3/5235* (2013.01)

(58) Field of Classification Search
None
See application file for complete search history.

(56) References Cited

U.S. PATENT DOCUMENTS

| | | | |
|---|---|---|---|
| 2010/0138282 A1* | 6/2010 | Kannan | G06Q 10/06398 705/7.42 |
| 2015/0195406 A1* | 7/2015 | Dwyer | G10L 25/72 379/265.07 |
| 2016/0036980 A1* | 2/2016 | Ristock | H04M 3/2236 379/265.12 |
| 2018/0190291 A1* | 7/2018 | Lore | G06Q 30/016 |
| 2022/0414578 A1* | 12/2022 | Vyas | G06Q 10/06395 |
| 2023/0085756 A1* | 3/2023 | Kassel | H04M 3/5238 379/242 |
| 2023/0179712 A1* | 6/2023 | Mecayten | H04M 3/5237 379/265.12 |
| 2024/0422264 A1* | 12/2024 | Pandey | H04M 3/5233 |

* cited by examiner

*Primary Examiner* — Harry S Hong
(74) *Attorney, Agent, or Firm* — SOROKER AGMON NORDMAN RIBA

(57) ABSTRACT

A computer-implemented method for dynamically prioritizing inbound interactions in a digital multi-channel contact center. The computer-implemented method includes for each inbound interaction via a digital channel: (i) operating an interaction analyzer module to extract one or more metadata parameters from the inbound interaction; (ii) operating a prioritization module to calculate a Digital Interaction Priority Score (DIPS) of the inbound interaction based on the one or more metadata parameters; and (iii) forwarding the DIPS to an interaction distribution module to route the inbound interaction to an agent based on the DIPS. The DIPS is periodically updated until the interaction is assigned to the agent.

16 Claims, 33 Drawing Sheets

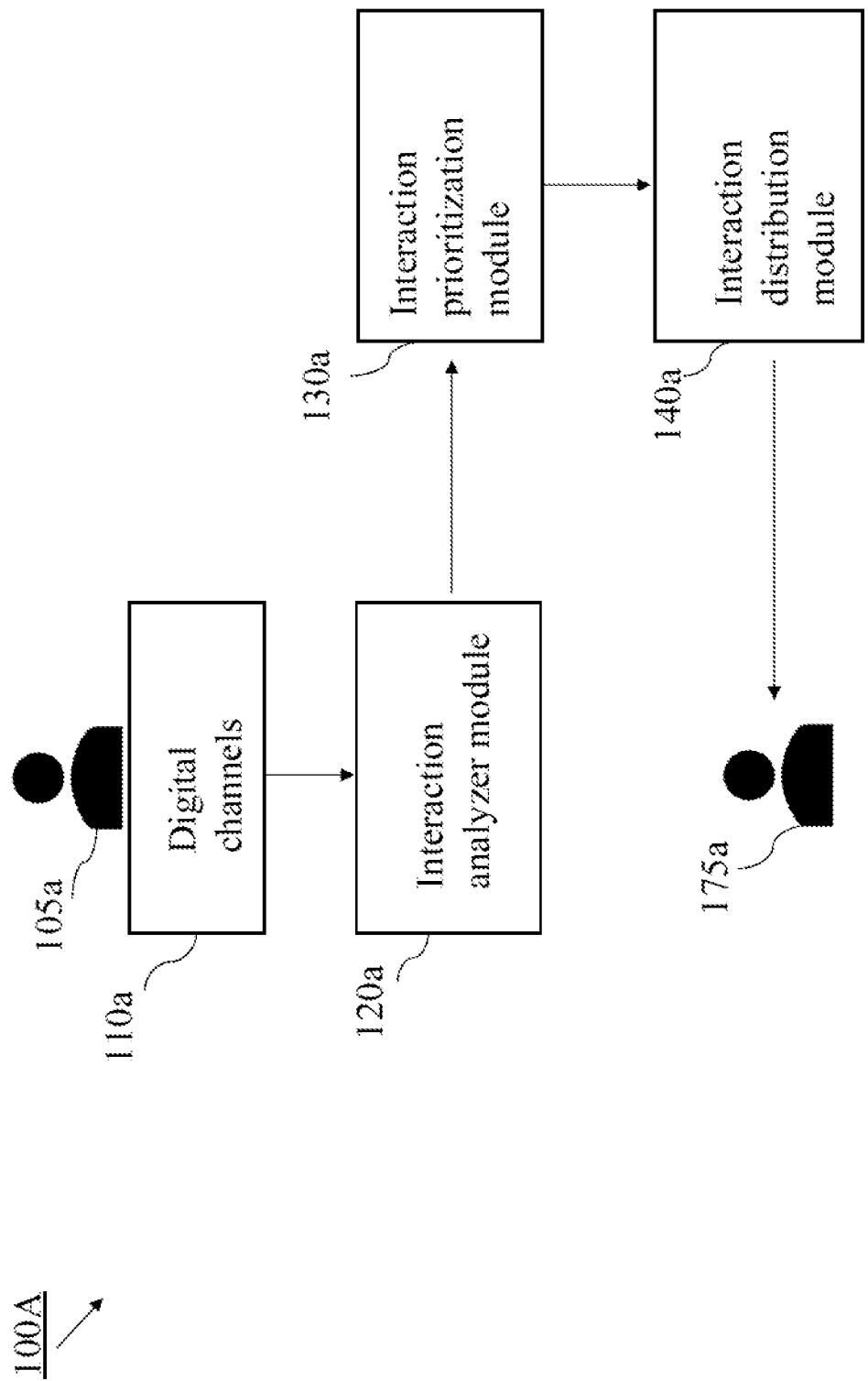

| Parameter | Additional Information | Parameter Type |
|---|---|---|
| Emergency Interaction (EmergencyInteraction) | Interactions containing tags as below: Emergency Accident Hospital Hospitalization SOS expiry value = 1 if yes, else 0 Any contact center can also configure tags or combination of tags and set different values. For e.g., emergency value is 1, emergency + accident value is 2 and so on | Critical service |
| Interaction Sentiment Analysis (Sentiment) | Category very positive, positive, neutral, negative, very negative. The rating is done on the scale 1 to 5. | Customer Behavior |
| Interaction Emotion analysis (Emotion) | fear - 20 upset - 15 anger - 12 sad - 10 pleasant - 7 happy - 6 jolly - 1 neutral - 0 | Customer Behavior |
| Interaction about high net revenue product or services. (HighRevenueProductOrService) | Value can differ based on category of high net product. For e.g for a car company like Ford the High Revenue Product will be as follows: Ford GT40 - Value 50 Shelby GT350 - Value 40 Ford Mustang GT390 - Value 30 | Potential Revenue |
| Interaction from verified customer. (VerifiedCustomer) | If yes value = 10 else 0 | Customer Value |
| Interaction from highly valued customer. (HighlyValuedCustomer) | If yes value = 100 else 0 | Customer Value |

| | | |
|---|---|---|
| Interaction from highly influential personality. (InfluentialPersonality) | If yes value=200 else 0 Contact centers and Customers can maintain a list of highly influential person's social media handles. | Interaction Influence |
| Time Elapsed for real time interactions (chat & messenger type) started (TimeElapsed) | value = 0 - less that a min value = number of min elapsed | Interaction Timeline |
| Time Elapsed since interaction(email) started (TimeElapsed) | value = 0 - less than an hour value = number of hours elapsed | Interaction Timeline |
| Time Elapsed for social media posts.(facebook, twitter, instagram posts) started (TimeElapsed) | value = 0 - less that a 10 min value = number of min elapsed/10 | Interaction Timeline |
| Number of reactions, retweets, comments (ResponsesCount) | value=sentiment score X count of reactions, retweets, comments X 0.1 For e.g. 20 likes/reactions were received for interaction with very negative sentiment then value=-5X20X0.1=-1 | Interaction Influence |
| Interaction wherein verified customers or influencers have reverted to the original query. | value=count of reactions, retweets, comments by verified customers & influencers and influencers *0.1 For e.g. 20 likes/reactions were received for interaction with very negative sentiment from verified customers or influencers then value=-5X2X10=1 | Interaction Influence |
| Interaction wherein some monetary value or transaction is being mentioned (HighMonetaryValue) | Monetary value or quantity being discussed as below: Buy 10 machines Buy product worth 1000$ Cost was 100$ Contact centers will have to add customized modules that look for references like buy and some quantity. They also can add bots who can ask for the quantity and type of product, and purchase value if product already purchased and then derive this parameter value. No Buy or need word not mentioned or no cost value mentioned- Value is 0 Examples: Buy and count 10 - Value is 10 Buy and count 20 - Value is 20 Buy product with value > 500$ - Value is 50 | Potential Revenue |

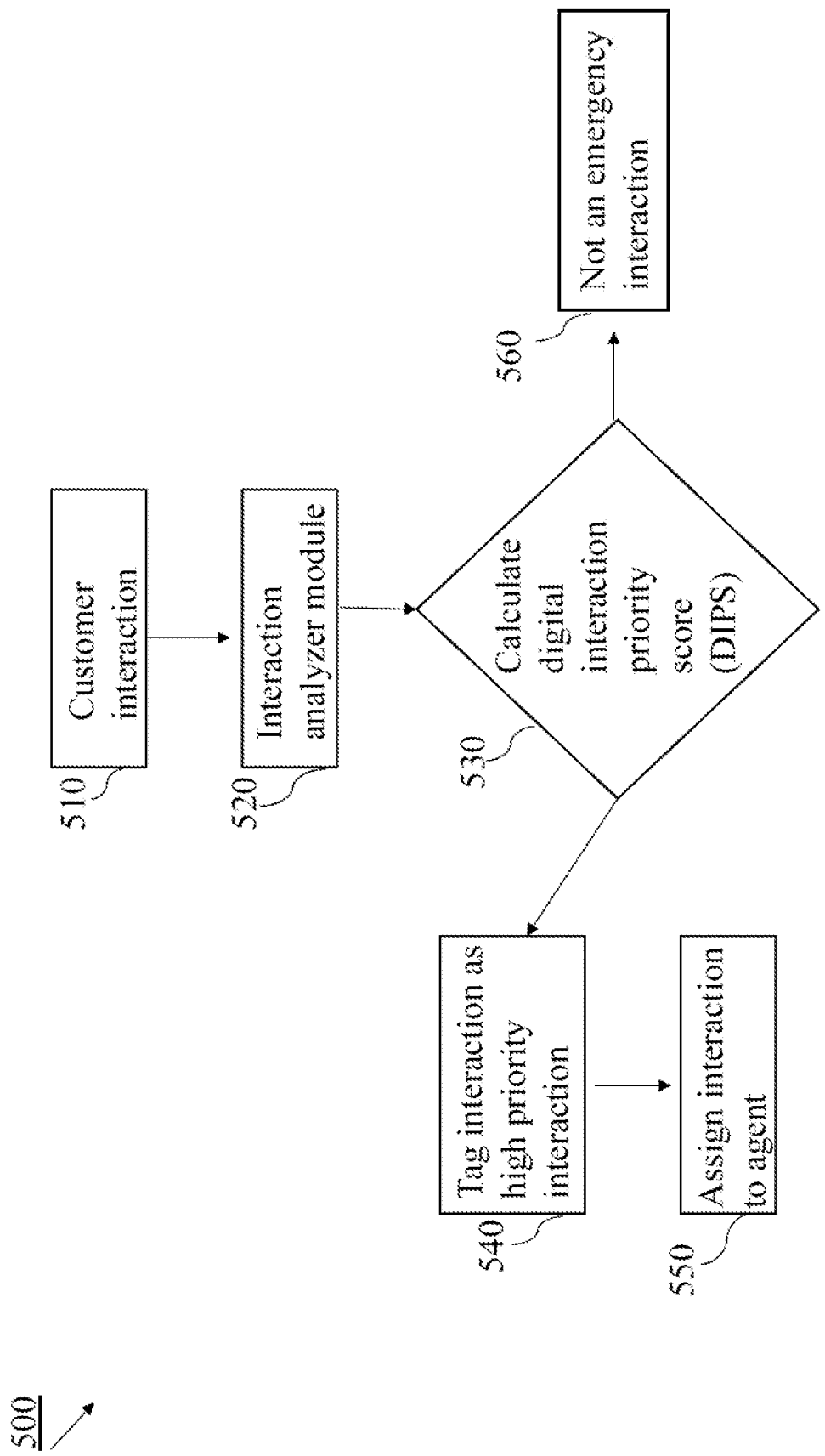

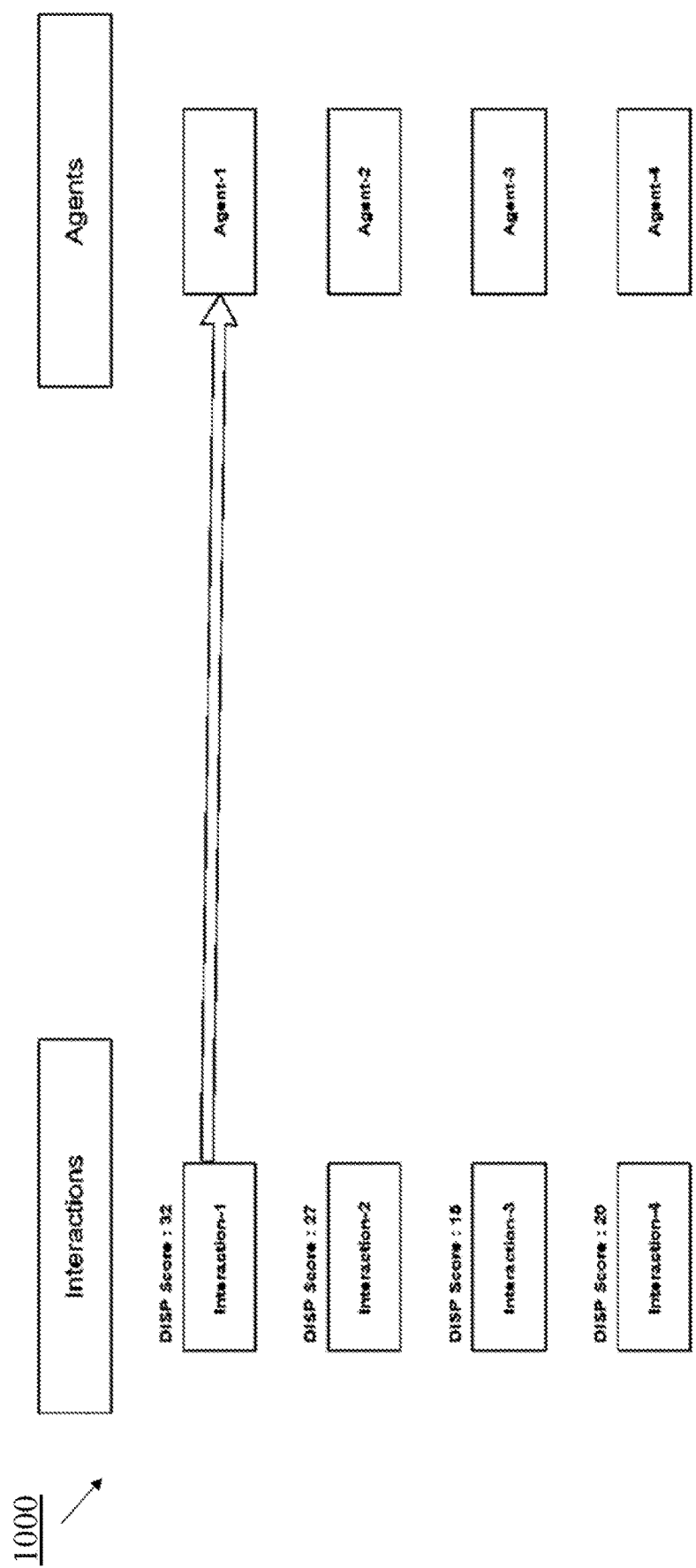

| Parameter | Additional Information | Parameter Category | value | weight | score = (actual value * weight) |
|---|---|---|---|---|---|
| Emergency Interaction (Interaction Type: Emergency) | Interactions containing parameters as below: Emergency Accident Hospital Hospitalization SOS expiry value = 1 if yes, else 0 Any contact center can also configure parameters or combination of parameters and set different values. For e.g., emergency value is 1, emergency + accident value is 2 and so on | Critical service | 1 | 200 | 200 |
| Interaction Sentiment Analysis (Sentiment) | Category very positive, positive, neutral, negative, very negative. The rating is done on the scale 1 to 5. | Customer Behavior | 5 | 10 | 50 |
| Interaction Emotion analysis (Emotion) | fear - 20 upset - 15 anger - 12 sad - 10 pleasant - 7 happy - 5 jolly - 1 neutral - 0 | Customer Behavior | 20 | 10 | 200 |

Figure 11A

| | | | | |
|---|---|---|---|---|
| Interaction about high net revenue product or services. (Interaction Type: HighRevenueProductOrService) | Value can defer based on category of high net revenue product. For e.g., for a car company like Ford the High Revenue Product will be as follows: Ford GT40 - Value 50 Shelby GT350 - Value 40 Ford Mustang GT390 - Value 30 | Potential Revenue Interaction | 50 | 10 | 500 |
| Interaction wherein some monetary value or transaction is being mentioned (HighMonetaryValue) | Monetary value or quantity being discussed as below: Buy 10 machines Buy product worth 1000$ Cost was 100$ Contact centers will have to add customized modules that look for references like buy and some quantity. They also can add bots who can ask for the quantity and type of product, and purchase value if product already purchased and then derive this parameter value. No Buy or need word not mentioned or no cost value mentioned- Value is 0 Examples: Buy and count 10 - Value is 10 Buy and count 20 - Value is 20 Buy product with value > 500$ - Value is 50 | Potential Revenue Interaction | 50 | 10 | 500 |
| Interaction from verified customer. (VerifiedCustomer) | If yes value = 10 else 0 | Customer Value | 10 | 1 | 10 |
| Interaction from highly valued customer. (HighlyValuedCustomer) | If yes value = 100 else 0 | Customer Value | 100 | 1 | 100 |

| | | | | |
|---|---|---|---|---|
| Interaction from customer having high number of followers / friends / connections. (FollowersCount) For e.g., followers greater than 1000 | This can also be categorized as below: 0 - 50 followers: value=0 50-100 followers: value =10 101-200 followers: value = 20 101-200 followers: value = 20 201-300 followers: value = 30 301-400 followers: value = 40 401-500 followers: value =50 501-600 followers: value = 60 601-700 followers: value = 70 701-800 followers: value = 80 801-900 followers: value = 90 901 and above: value = 100 | Interaction Influence | 50 | 1 | 50 |
| Interaction from highly influential personality. (InfluentialPersonality) | If yes value=200 else 0 Contact centers and Customers can maintain a list of highly influential person's social media handles. | Interaction Influence | 200 | 1 | 200 |
| Number of reactions, retweets, comments (ResponsesCount) | value=sentiment score X count of reactions, retweets, comments X 0.1 For e.g., 20 likes/reactions were received for interaction with very negative sentiment then value=5X20X0.1=1 | Interaction Influence | 10 | 1 | 10 |
| Interaction wherein verified customers or influencers have reverted to the original query (InfluencerResponsesCount) | value=count of reactions, retweets, comments by verified customers & influencers and influencers *0.1 For e.g., 20 reactions were received for interaction with very negative sentiment from verified customers or influencers then value=5X2X10=1 | Interaction Influence | 100 | 1 | 100 |

| Time Elapsed for real time interactions (chat & messenger type) started (TimeElapsed) | value = 0 - less than that a min value = number of min elapsed | Interaction Timeline | 10 | 10 | 1 | 10 |
|---|---|---|---|---|---|---|
| Time Elapsed since interaction(email) started (TimeElapsed) | value = 0 - less than an hour value = number of hours elapsed | Interaction Timeline | 0 | 0 | 1 | 0 |
| Time Elapsed for social media posts (Facebook, twitter, Instagram posts) started (TimeElapsed) | value = 0 - less than 10 min value = (number of min elapsed)/10 | Interaction Timeline | 0 | 0 | 1 | 0 |
| Interaction Case nearing or about to breach OLA. This will consider the time elapsed since case start. (InteractionNearingOLABreach) | By default, value is 0 and as per the OLA configuration per channel or skill type the values could be as below.<br><br>1-week nearing OLA breach value = 50<br>3 days nearing OLA breach value=100<br>2 days nearing OLA breach value=150<br>1 day nearing OLA breach value=200<br>3 hours nearing OLA breach value=300<br>2 hours nearing OLA breach value=400<br>1 hour nearing OLA breach value=500<br>OLA breached value=700<br><br>For each interaction there will be operational, or service level agreements defined. Based on that it can be determined if the interaction is near the breach time.<br>For e.g., if each email must be responded within 3 working days that this parameter value will be high once 2 days have been passed where agent hasn't responded.<br>Similarly each digital interaction can have different value defined to increase the prioritization | Interaction Timeline | 50 | 50 | 1 | 50 |

Figure 11D

| Parameter | Additional Information | Parameter Type | value | weight | score = (actual value * weight) |
|---|---|---|---|---|---|
| Emergency interaction (EmergencyInteraction) | Interactions containing parameters as below.<br>Emergency<br>Accident<br>Hospital<br>Hospitalization<br>SOS<br>expiry<br>value = 1 if yes, else 0<br>Any contact center can also configure parameters or combination of parameters and set different values. For e.g., emergency value is 1, emergency + accident value is 2 and so on | Critical service | 0 | 200 | 0 |
| Interaction Sentiment Analysis (Sentiment) | Category very positive, positive, neutral, negative, very negative. The rating is done on the scale 1 to 5. | Customer Behavior | 3 | 10 | 30 |
| Interaction Emotion Analysis (Emotion) | fear - 20<br>upset - 15<br>anger - 12<br>sad - 10<br>pleasant - 7<br>happy - 5<br>jolly - 1<br>neutral - 0 | Customer Behavior | 0 | 10 | 0 |

Figure 12A

| | | | | |
|---|---|---|---|---|
| Interaction about high net revenue product or services. (HighRevenueProductOrService) | Value can defer based on category of high net product. For e.g., for a car company like Ford the High Revenue Product will be as follows:<br>Ford GT40 - Value 50<br>Shelby GT350 - Value 40<br>Ford Mustang GT390 - Value 30 | Potential Revenue Interaction | 0 | 10 | 0 |
| Interaction wherein some monetary value or transaction is being mentioned (HighMonetaryValue) | Monetary value or quantity being discussed as below:<br>Buy 10 machines<br>Buy product worth 1000$<br>Cost was 100$<br>Contact centers will have to add customized modules that look for references like buy and some quantity. They also can add bots who can ask for the quantity and type of product, and purchase value if product already purchased and then derive this parameter value.<br>No Buy or need word not mentioned or no cost value mentioned- Value is 0<br>Examples:<br>Buy and count 10 - Value is 10<br>Buy and count 20 - Value is 20<br>Buy product with value > 500$ - Value is 50 | Potential Revenue Interaction | 0 | 10 | 0 |
| Interaction from verified customer. (VerifiedCustomer) | If yes value = 10 else 0 | Customer Value | 10 | 1 | 10 |
| Interaction from highly valued customer. (HighlyValuedCustomer) | If yes value = 100 else 0 | Customer Value | 0 | 1 | 0 |

Figure 12B

| | | | | |
|---|---|---|---|---|
| Interaction from customer having high number of followers / friends / connections. (FollowersCount) For e.g., followers greater than 1000 | This can also be categorized as below: 0 - 50 followers: value=0 50-100 followers: value = 10 101-200 followers: value = 20 101-200 followers: value = 20 201-300 followers: value = 30 301-400 followers: value = 40 401-500 followers: value = 50 501-600 followers: value = 60 601-700 followers: value = 70 701-800 followers: value = 80 801-900 followers: value = 90 901 and above: value = 100 | Interaction influence | 0 | 1 | 0 |
| Interaction from highly influential personality. (InfluentialPersonality) | If yes value=200 else 0 Contact centers and Customers can maintain a list of highly influential person's social media handles. | Interaction influence | 0 | 1 | 0 |
| Number of reactions, retweets, comments (ResponsesCount) | value=sentiment score X count of reactions, retweets, comments X 0.1 For e.g., 20 reactions were received for interaction with very negative sentiment then value=5X20X0.1=1 | Interaction influence | 0 | 1 | 0 |
| Interaction wherein verified customers or influencers have reverted to the original query. (InfluencerResponsesCount) | value=count of reactions, retweets, comments by verified customers & influencers and influencers *0.1 For e.g., 20 likes were received for interaction with very negative sentiment from verified customers or influencers then value=5X2X10=1 | Interaction influence | 0 | 1 | 0 |

| | | | | | |
|---|---|---|---|---|---|
| Time Elapsed for real time interactions (chat & messenger type) started (TimeElapsed) | value = 0 - less that a min<br>value = number of min elapsed | Interaction Timeline | 0 | 1 | 0 |
| Time Elapsed since interaction(email) started (TimeElapsed) | value = 0 - less than an hour<br>value = number of hours elapsed | Interaction Timeline | 0 | 1 | 0 |
| Time Elapsed for social media posts (Facebook, twitter, Instagram posts) started (TimeElapsed) | value = 0 - less that a 10 min<br>value = (number of min elapsed)/10 | Interaction Timeline | 0 | 1 | 0 |
| Interaction Case nearing or about to breach OLA. This will consider the time elapsed since case start. (InteractionNearingOLABreach) | 1-week nearing OLA breach value = 50<br>3 days nearing OLA breach value=100<br>2 days nearing OLA breach value=150<br>1 day nearing OLA breach value=200<br>3 hours nearing OLA breach value=300<br>2 hours nearing OLA breach value=400<br>1 hour nearing OLA breach value=500<br>OLA breached value=700<br>For each interaction there will be operational, or service level agreements defined. Based on that it can be determined if the interaction is near the breach time.<br>For e.g., if each email must be responded within 3 working days that this parameter value will be yes once 2 days have been passed where agent hasn't responded.<br>Similarly each digital interaction can have a deadline defined after which the interaction can be tagged as InteractionNearingOLABreach=true | Interaction Timeline | 0 | 1 | 0 |

| Parameter | Additional Information | Parameter Type | value | weight | score = (actual value * weight) |
|---|---|---|---|---|---|
| Emergency interaction (EmergencyInteraction) | Interactions containing parameters as below:<br>Emergency<br>Accident<br>Hospital<br>Hospitalization<br>SOS<br>expiry<br>value = 1 if yes, else 0<br>Any contact center can also configure parameters or combination of parameters and set different values. For e.g., emergency value is 1, emergency + accident value is 2 and so on | Critical service | 1 | 200 | 200 |
| Interaction Sentiment Analysis (Sentiment) | Category very positive, positive, neutral, negative, very negative. The rating is done on the scale 1 to 5. | Customer Behavior | 5 | 10 | 50 |
| Interaction Emotion analysis (Emotion) | fear - 20<br>upset - 15<br>anger - 12<br>sad - 10<br>pleasant - 7<br>happy - 5<br>jolly - 1<br>neutral - 0 | Customer Behavior | 20 | 10 | 200 |

| Description | Details | Category | Col1 | Col2 | Col3 |
|---|---|---|---|---|---|
| Interaction about high net revenue product or services. (HighRevenueProductOrService) | Value can differ based on category of high net product. For e.g., for a car company like Ford the High Revenue Product will be as follows: Ford GT40 - Value 50; Shelby GT350 - Value 40; Ford Mustang GT390 - Value 30 | Potential Revenue Interaction | 0 | 10 | 0 |
| Interaction wherein some monetary value or transaction is being mentioned (HighMonetaryValue) | Monetary value or quantity being discussed as below: Buy 10 machines; Buy product worth 100$; Cost was 10$. Contact centers will have to add customized modules that look for references like buy and some quantity. They also can add bots who can ask for the quantity and type of product, and purchase value if product already purchased and then derive this parameter value. No Buy or need word not mentioned or no cost value mentioned- Value is 0. Examples: Buy and count 10 - Value is 10; Buy and count 20 - Value is 20; Buy product with value > 500$ - Value is 50 | Potential Revenue Interaction | 0 | 10 | 0 |
| Interaction from verified customer. (VerifiedCustomer) | If yes value = 10 else 0 | Customer Value | 10 | 1 | 10 |
| Interaction from highly valued customer. (HighlyValuedCustomer) | If yes value = 100 else 0 | Customer Value | 0 | 1 | 0 |

| Parameter | Description | | | | |
|---|---|---|---|---|---|
| Interaction from customer having high number of followers. (FollowersCount) For e.g., followers greater than 1000 | This can also be categorized as below: 0 - 50 followers: value=0 50-100 followers: value =10 101-200 followers: value = 20 101-200 followers: value = 20 201-300 followers: value = 30 301-400 followers: value = 40 401-500 followers: value = 50 501-600 followers: value = 60 601-700 followers: value = 70 701-800 followers: value = 80 801-900 followers: value = 90 901 and above: value = 100 | Interaction influence | 0 | 1 | 0 |
| Interaction from highly influential personality. (InfluentialPersonality) | If yes value=200 else 0 Contact centers and Customers can maintain a list of highly influential person's social media handles. | Interaction influence | 0 | 1 | 0 |
| Interaction wherein verified customers or influencers have reverted to the original query. (InfluentialResponsesCount) | value=count of reactions, retweets, comments by verified customers & influencers and influencers *0.1 For e.g., 20 likes were received for interaction with very negative sentiment from verified customers or influencers then value=5X2X10=1 | Interaction influence | 20 | 1 | 20 |
| Number of reactions, retweets, comments (ResponsesCount) | value=sentiment score X count of reactions, retweets, comments X 0.1 For e.g., 20 likes were received for interaction with very negative sentiment then value=5X20X0.1=1 | Interaction influence | 10 | 1 | 10 |

| | Interaction Timeline | 10 | 1 | 10 |
|---|---|---|---|---|
| Time Elapsed for real time interactions (chat & messenger type) started (TimeElapsed) | value = 0 - less that a min<br>value = number of min elapsed | | | |
| Time Elapsed since interaction(email) started (TimeElapsed) | value = 0 - less than an hour<br>value = number of hours elapsed | Interaction Timeline | 0 | 1 | 0 |
| Time Elapsed for social media posts (Facebook, twitter, Instagram posts) started (TimeElapsed) | value = 0 - less that a 10 min<br>value = (number of min elapsed)/10 | Interaction Timeline | 0 | 1 | 8 |
| Interaction Case nearing or about to breach OLA. This will consider the time elapsed since case start. (InteractionNearingOLABreach) | 1-week nearing OLA breach value = 50<br>3 days nearing OLA breach value=100<br>2 days nearing OLA breach value=150<br>1 day nearing OLA breach value=200<br>3 hours nearing OLA breach value=300<br>2 hours nearing OLA breach value=400<br>1 hour nearing OLA breach value=500<br>OLA breached value=700<br>For each interaction there will be operational, or service level agreements defined. Based on that it can be determined if the interaction is near the breach time.<br>For e.g., if each email must be responded within 3 working days that this parameter value will be yes once 2 days have been passed where agent hasn't responded.<br>Similarly each digital interaction can have a deadline defined after which the interaction can be tagged as InteractionNearingOLABreach=true | Interaction Timeline | 0 | 1 | 0 |

| Interaction wherein customer had bad experience earlier with customer services on digital channels (CustomerPastExperience) | Value is 1 if customer sentiments for x% of the digital interactions has been negative and very negative. Value is 0 otherwise x could 50 which indicates that out of 10 interactions 5 or more had negative customer sentiments | *CustomerExperience* | 1 | 50 | 50 |

Digital interaction priority score (DIPS)
Formula = Σall parameter scores

550

Figure 13E

| Parameter | Additional Information | Meta Data Added to Interaction |
|---|---|---|
| Emergency interaction (EmergencyInteraction) | Interactions containing parameters as below:<br>Emergency<br>Accident<br>Hospital<br>Hospitalization<br>SOS<br>expiry<br>value = 1 if yes, else 0<br>Any contact center can also configure parameters or combination of parameters and set different values. For e.g., emergency value is 1, emergency + accident value is 2 and so on | "EmergencyInteraction": "7" |
| Interaction Sentiment Analysis (Sentiment) | Category very positive, positive, neutral, negative, very negative. The rating is done on the scale 1 to 5. | "sentiment": "negative" |
| Interaction Emotion analysis (Emotion) | fear - 20<br>upset - 15<br>anger - 12<br>sad - 10<br>pleasant - 7<br>happy - 5<br>jolly - 1<br>neutral - 0 | "Emotion": "sad" |

| | | |
|---|---|---|
| Interaction about high net revenue product or services. (HighRevenueProductOrService) | Value can defer based on category of high net product. For e.g., for a car company like Ford the High Revenue Product will be as follows:<br>Ford GT40 - Value 50<br>Shelby GT350 - Value 40<br>Ford Mustang GT390 - Value 30 | "HighRevenueProductOrService": false, |
| Interaction wherein some monetary value or transaction is being mentioned (HighMonetaryValue) | Monetary value or quantity being discussed as below:<br>Buy 10 machines<br>Buy product worth 1000$<br>Cost was 100$<br>Contact centers will have to add customized modules that look for references like buy and some quantity. They also can add bots who can ask for the quantity and type of product, and purchase value if product already purchased and then derive this parameter value.<br>No Buy or need word not mentioned or no cost value mentioned.- Value is 0<br>Examples:<br>Buy and count 10 - Value is 10<br>Buy and count 20 - Value is 20<br>Buy product with value > 500$ - Value is 50 | "HighMonetaryValue":0, |

| Interaction from verified customer. (VerifiedCustomer) | If yes value = 10 else 0 | "verifiedCustomer": "yes" |
| Interaction from highly valued customer. (HighlyValuedCustomer) | If yes value = 100 else 0 | "highlyValuedCustomer": "no" |
| Interaction from customer having high number of followers. (FollowersCount) For e.g., followers greater than 1000 | This can also be categorized as below: 0 - 50 followers: value=0 50-100 followers: value =10 101-200 followers: value = 20 201-300 followers: value = 30 301-400 followers: value = 40 401-500 followers: value =50 501-600 followers: value = 60 601-700 followers: value = 70 701-800 followers: value = 80 801-900 followers: value = 90 901 and above: value = 100 | "followersCount": 10 |
| Interaction from highly influential personality. (InfluentialPersonality) | If yes value= 200 else 0 Contact centers and Customers can maintain a list of highly influential person's social media handles. | "InfluentialPersonality": "no" |
| Number of reactions, retweets, comments (ResponsesCount) | value=sentiment score X count of reactions, retweets, comments X 0.1 For e.g., 20 likes were received for interaction with very negative sentiment then value=5X20X0.1=1 | "responsesCount": 20 |
| Interaction wherein verified customers or influencers have reverted to the original query (InfluencerResponsesCount) | value=count of reactions, retweets, comments by verified customers & influencers X sentiment from verified customers or influencers *0.1 For e.g., 20 likes were received for interaction with very negative sentiment from verified customers or influencers then value=5X2X10=1 | "InfluencerResponsesCount":0 |

Figure 15C

| Time Elapsed for social media posts (Facebook, twitter, Instagram posts) (TimeElapsed) | value = 0 - less than a 10 min value = (number of min elapsed)*10 | "TimeElapsed":0 |
| --- | --- | --- |
| Interaction Case nearing or about to breach OLA. This will consider the time elapsed since case start. (interactionNearingOLABreach) | 1-week nearing OLA breach value = 50<br>3 days nearing OLA breach value=100<br>2 days nearing OLA breach value=150<br>1 day nearing OLA breach value=200<br>3 hours nearing OLA breach value=300<br>2 hours nearing OLA breach value=400<br>1 hour nearing OLA breach value=500<br>OLA breached value=700<br>For each interaction there will be operational, or service level agreements defined. Based on that it can be determined if the interaction is near the breach time. For e.g., if each email must be responded within 3 working days that this parameter value will be yes once 2 days have been passed where agent hasn't responded. Similarly each digital interaction can have a deadline defined after which the interaction can be tagged as interactionNearingOLABreach=true | "interactionNearingOLABreach": "no" |

Figure 15D

METHOD FOR DYNAMICALLY PRIORITIZING INBOUND INTERACTIONS IN A DIGITAL MULTI-CHANNEL CONTACT CENTER

TECHNICAL FIELD

The present disclosure relates to the field of data analysis for dynamically prioritizing inbound interactions in a digital multi-channel contact center.

BACKGROUND

Along with an increased adoption of digital channels in contact centers, there is a constant need to prioritize interactions dynamically and periodically when there's low agent bandwidth against high volume of digital channel interactions, such that high priority interactions may be attended before low priority interactions. Moreover, the static prioritization of interactions in current systems is not influenced or corrected when the customers publish feedback in social media in the form of likes, dislikes, or negative feedback.

Also, due to the static prioritization, in case of high volume of digital interactions, there may be a situation in which interactions, that should be considered as low priority based on predefined parameters, may be addressed before interactions that according to the predefined parameters should be considered as high priority, thus first response and resolution time of high priority interactions may be increased. Accordingly, there is a need for a technical solution for dynamic prioritization that will be based on interaction Key Performance Indicator (KPI)s.

Emergency services are also increasingly adopting to digital channels and hence prioritization of interactions asking for immediate assistance in comparison to waiting for the service, is significant. In the absence of dynamic prioritization, emergency interactions may experience high turnaround time which may lead to customer dissatisfaction and may also be customers life threatening at times.

Since dissatisfaction quotient spreads rapidly on digital channels than via traditional channels, it may have detrimental impact on the company brand and long turn reputation. This in turn may have impact on future company prospects and may contribute to an increased negative sentiment. The agents in turn may feel burnout due to inadequate prioritization of interactions which may lead to low employee morale and increased attrition levels.

Accordingly, there is a need for a technical solution for dynamic interactions prioritization at any given point of time to ensure that agents are handling interactions in its appropriate prioritization to maximize the impact on customers on digital channels.

SUMMARY

There is thus provided, in accordance with some embodiments of the present disclosure, a computer-implemented method for dynamically prioritizing inbound interactions in a digital multi-channel contact center.

Furthermore, in accordance with some embodiments of the present disclosure, the computer-implemented method includes for each inbound interaction via a digital channel: (i) operating an interaction analyzer module to extract one or more metadata parameters from the inbound interaction; (ii) operating a prioritization module to calculate a Digital Interaction Priority Score (DIPS) of the inbound interaction based on the one or more metadata parameters; and (iii) forwarding the DIPS to an interaction distribution module to route the inbound interaction to an agent based on the DIPS. The DIPS is in an inverse relationship to a size of an interaction-queue of the agent.

Furthermore, in accordance with some embodiments of the present disclosure, the DIPS may be presented to the agent when the inbound interaction is added the interaction-queue of the agent, and the DIPS may be periodically updated while the inbound interaction is in the interaction-queue of the agent.

Furthermore, in accordance with some embodiments of the present disclosure, when the DIPS reaches a value that corresponds to a first related time-limit the inbound interaction may move to be first out of the interaction-queue of the agent.

Furthermore, in accordance with some embodiments of the present disclosure, each DIPS value has a preconfigured time-limit.

Furthermore, in accordance with some embodiments of the present disclosure, the DIPS of each interaction may be displayed via a supervisor dashboard.

Furthermore, in accordance with some embodiments of the present disclosure, when the DIPS may reach a value that corresponds to a second related time-limit the inbound interaction may be routed to another agent or to a supervisor.

Furthermore, in accordance with some embodiments of the present disclosure, the one or more metadata parameters may include at least one of: (i) critical service (ii) customer behavior; (iii) potential revenue; (iv) customer value (v) interaction influence; (vi) interaction timeline: (vii) customer experience; and (viii) one or more tags.

Furthermore, in accordance with some embodiments of the present disclosure, the DIPS may be calculated by formula I:

$$\text{Digital Interaction Priority Score } (DIPS) = \quad (I)$$
$$\sum (\text{critical service category parameters} * W1) +$$
$$(\text{customer behavior category parameters} * W2) +$$
$$(\text{potential revenue category parameters} * W3) +$$
$$(\text{customer value category parameters} * W4) +$$
$$(\text{interaction influence category parameters} * W5) +$$
$$(\text{interaction timeline category parameters} * W6) +$$
$$(\text{customer experience category parameters} * W7),$$

whereby:
critical service category parameters include parameters that indicates if the inbound interaction is critical,
customer behavior category parameters are parameters that indicates customer sentiment and emotion in the interaction, potential revenue is a parameter that indicates if the subject of the interaction is preconfigured as high net worth.
customer value category parameters are parameters that indicates if the customer has reverted to an original interaction, interaction influence is a parameter that indicates that the customer of the interaction is an influencer in social media,
interaction timeline category parameters are parameters that indicates if the interaction has reached a preconfigured deadline, customer experience is a parameter that indicates negative feedback or sentiment, W1 is a first preconfigured weight,
W2 is a second preconfigured weight,
W3 is a third preconfigured weight,
W4 is a fourth preconfigured weight.
W5 is a fifth preconfigured weight,
W6 is a sixth preconfigured weight, and
W7 is a seventh preconfigured weight.

Furthermore, in accordance with some embodiments of the present disclosure, the critical service may be calculated by formula II, $$\prod_{i=0}^{n} (\text{Critical Service Category parameters})i \qquad (II)$$

whereby:
i is first critical service parameter category that has been configured as related to critical service, and its value could be '1' or '0'.

Furthermore, in accordance with some embodiments of the present disclosure, the customer behavior may be calculated by formula III:

$$\prod_{i=0}^{n} (\text{Customer Behaviour category parameters})i \qquad (III)$$

whereby:
i is an aggregation of second interaction category parameters that has been configured as related to sentiment and emotion, and
the second interaction category includes the following parameters:
interaction sentiment which has values from '1' to '5', and
interaction emotion which has values '0' to '20' based on the interaction emotion.

Furthermore, in accordance with some embodiments of the present disclosure, the potential revenue may be calculated by formula VI:

$$\prod_{i=0}^{n} (\text{Potential Revenue category parameters})i \qquad (VI)$$

whereby:
i is a third interaction category that has been configured as related to potential revenue category parameters, and
the third interaction parameters are based on a mapping table.

Furthermore, in accordance with some embodiments of the present disclosure, the customer value may be calculated by formula V:

$$\prod_{i=0}^{n} (\text{Customer Value category parameters})i \qquad (V)$$

whereby:
i is a fourth interaction category that has been configured as related to verified customer or high value customer, and the fourth interaction category includes the following parameters:
verified customer which has a value of '10' or '0' and high value customer which has a value of '100' or '0'.

Furthermore, in accordance with some embodiments of the present disclosure, the customer value may be calculated by formula VI:

$$\prod_{i=0}^{n} (\text{Interaction influence category parameters})i \qquad (VI)$$

whereby:
i is a fifth interaction category that has been configured as related to interaction influence, and
the fifth interaction category parameters are based on a mapping table of categories of number of followers and a value.

Furthermore, in accordance with some embodiments of the present disclosure, the interaction timeline may be calculated by formula VII:

$$\prod_{i=0}^{n} (\text{Interaction Timelines category parameters})i \qquad (VII)$$

whereby:
i is a sixth interaction category that has been configured as related to interaction timeline, and
the sixth interaction category parameters are based on a timeline mapping table.

Furthermore, in accordance with some embodiments of the present disclosure, the customer experience may be calculated by formula VIII:

$$\prod_{i=0}^{n} (\text{Customer Experience category parameters})i \qquad (VIII)$$

whereby:
i is a seventh interaction category that has been configured as related to customer experience, and the seventh interaction category parameter value is '1' or '0'.

Furthermore, in accordance with some embodiments of the present disclosure, interactions in the interaction-queue may be selected to be recorded based on the DIPS of the inbound interaction.

BRIEF DESCRIPTION OF THE DRAWINGS

FIGS. 4A-4B show a table of parameters extracted by interaction analyzer module, in accordance with some embodiments of the present disclosure:

FIG. 5 is a high-level workflow of dynamically prioritizing inbound interactions in a digital multi-channel contact center, in accordance with some embodiments of the present disclosure;

FIG. 10 is an example of inbound interaction routing based on Digital Interaction Priority Score (DIPS), in accordance with some embodiments of the present disclosure;

FIGS. 11A-11E are a table of parameters which are used for dynamic prioritization of inbound interactions, in accordance with some embodiments of the present disclosure;

FIGS. 12A-12E is a simulation of DIPS calculation of an inbound interaction with a low priority, in accordance with some embodiments of the present disclosure;

FIGS. 13A-13E show a simulation of reprioritization of high priority inbound interaction based on a calculated low DIPS, in accordance with some embodiments of the present disclosure;

FIGS. 15A-15D show an example of extracted metadata parameters by an interaction analyzer module, in accordance with some embodiments of the present disclosure.

DETAILED DESCRIPTION

Figure 1B:
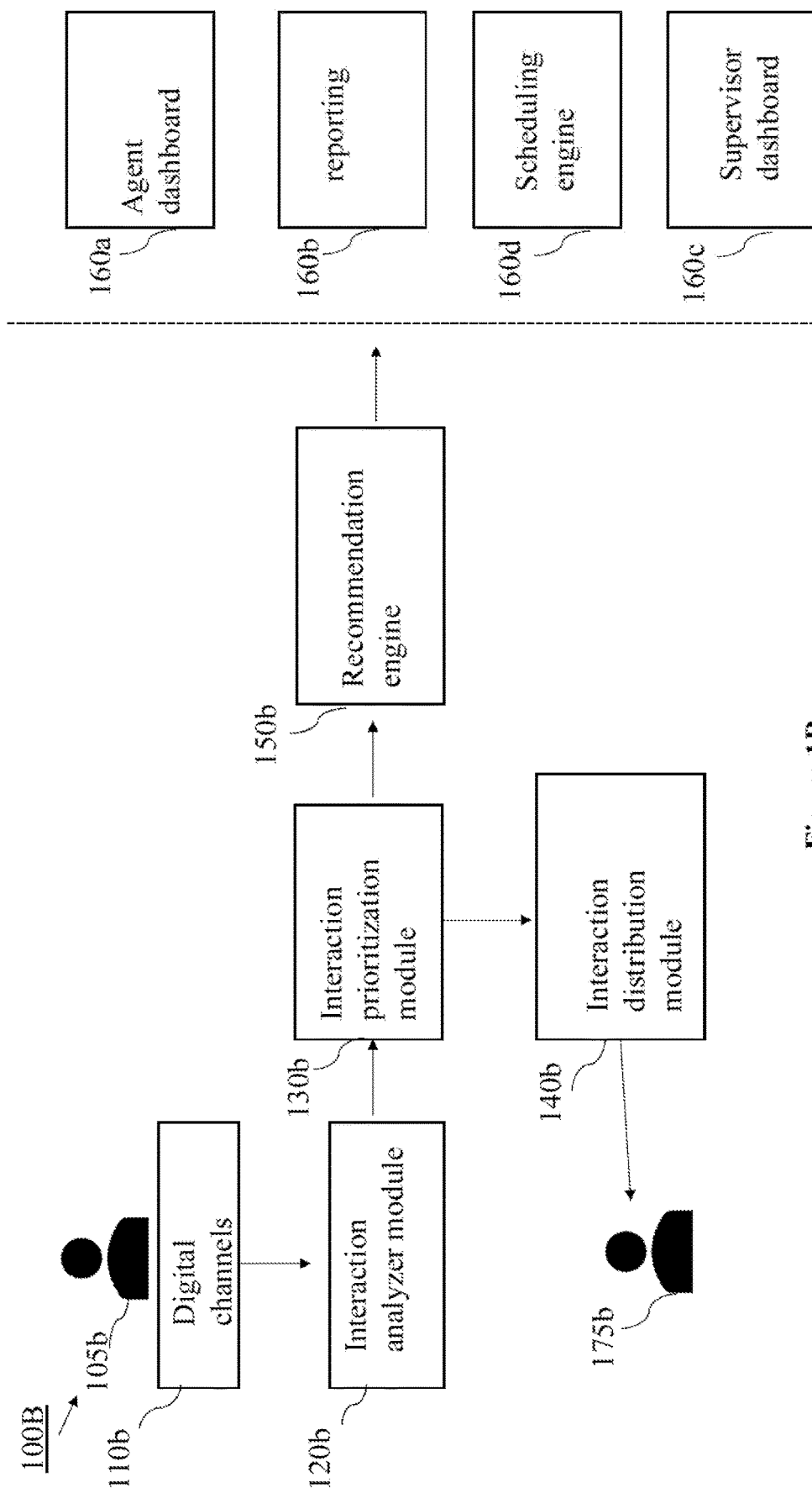
FIGS. 1A-IC schematically illustrate a high-level diagram of a system for dynamically prioritizing inbound interactions in a digital multi-channel contact center, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example. "processing," "computing," "calculating," "determining." "establishing", "analyzing". "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "static prioritization" as used herein refers to prioritization provided to an inbound interaction from a customer once it is received in the contact center, which is calculated once and not updated after follow-up interactions from the customer. The static prioritization is based on static parameters for example, such as priority set for request coming from high priority customer or interaction received on a specific channel or skill.

The term "dynamic prioritization" as used herein refers to periodically calculating a Digital Interaction Priority Score of an inbound interaction until the interaction is handled by an agent, including follow-up inbound interactions from the customer on the same channel.

In the absence of dynamic prioritization in current systems in contact centers, digital interactions may have the following issues. Emergency interactions may experience high turnaround time which may lead to customer dissatisfaction and can be customers life threatening at times. Also, since customers dissatisfaction quotient spreads rapidly on digital channels than via traditional channels, customers dissatisfaction may have detrimental impact on the company brand and long turn reputation with the customers and may also have impact on future company prospects that may lead to increased negative sentiment.

Agents in turn may feel burnout as a consequence of inadequate prioritization interactions which may result in low employee morale and increased attrition levels. Accordingly, there is a need for a technical solution for dynamic prioritization in contact centers to ensure that appropriate prioritization of interactions is considered.

Therefore, there is a need for a method for dynamically prioritizing inbound interactions in a digital multi-channel contact center.

FIG. 1A schematically illustrates a high-level diagram of a system 100A for dynamically prioritizing inbound interactions in a digital multi-channel contact center, in accordance with some embodiments of the present disclosure.

According to some embodiments of the present disclosure, a system, such as system 100A may ensure that digital inbound interactions may be prioritized dynamically such that high priority interactions are responded at a faster pace as compared to low priority interactions. System 100A may identify emergency requests, dissatisfied customers, highly influential public figures and results in better customer service and brand Public Relations (PR). By presenting the agents with the DIPS of each interaction that is assigned to them the agents may be aware of the interactions priority and may response accordingly.

According to some embodiments of the present disclosure, optionally, system 100A may operate in a cloud computing environment.

According to some embodiments of the present disclosure, when there is an agent slot available for a given skill, then an interaction for that skill which has highest DIPS score may be selected where DIPS is calculated periodically at predefined intervals. The DIPS may be calculated for each interaction and as per the score the interactions may be prioritized and routed to interaction-queue of an agent and then periodically recalculated.

According to some embodiments of the present disclosure, a system, such as system 100A may route interactions of customers 105*a* which may be received via digital channels 110*a* to the interaction-queue of each agent based on dynamic prioritization of the interactions, such that interactions that have been considered as high priority, e.g., having a Digital Interaction Priority Score (DIPS) above a preconfigured threshold may be handled before interactions that have a DIPS below the preconfigured threshold. The interactions having a high priority may be handled before interactions with a low DIPS by routing the interactions with high priority to agents having a relatively short interaction-queue, i.e., the agents are more available to handle the inbound interaction.

According to some embodiments of the present disclosure, the DIPS may be calculated for each inbound interaction which has been received via a digital channel. The calculation of the DIPS may be performed by operating an interaction analyzer module 120a to extract one or more metadata parameters from the inbound interaction, then, operating a prioritization module, such as interaction prioritization module 130a to calculate the DIPS of the inbound interaction based on the one or more metadata parameters and then forwarding the DIPS to an interaction distribution module 140a to route the inbound interaction to the agent 175a based on the DIPS. The interaction is routed to the interaction-queue of an agent such that the DIPS is in inverse relationship to the size of the interaction-queue.

According to some embodiments of the present disclosure, the priority of the interaction may be categorized as one of: 'High', 'Medium' and 'Low', based on the calculated DIPS for reporting purposes. The contact center may generate a report on the number of interaction categories handled in total as well as per agent and may be used as performance indicator for an agent.

According to some embodiments of the present disclosure, the interaction analyzer module 120a may analyze the inbound interaction and may extract metadata parameters for the interaction. For example, an interaction from a highly influential person, emergency type and the like, as configured by the contact center. Other parameters and optional values which may be extracted by the interaction analyzer module 120a are shown in FIGS. 4A-4B.

According to some embodiments of the present disclosure, the prioritization module, such as interaction prioritization module 130a may calculate the DIPS score for each inbound interaction. Based on the calculated DIPS score an interaction having the highest DIPS may be assigned to an agent having the shortest interaction-queue of all agents at that point of time.

According to some embodiments of the present disclosure, the DIPS of the interaction may be presented to the agent via a display unit when the inbound interaction is added the interaction-queue of the agent, such that the agent may consider the DIPS of each interaction in the interaction-queue when the agent is selecting the next interaction in the interaction-queue.

Figure 9:
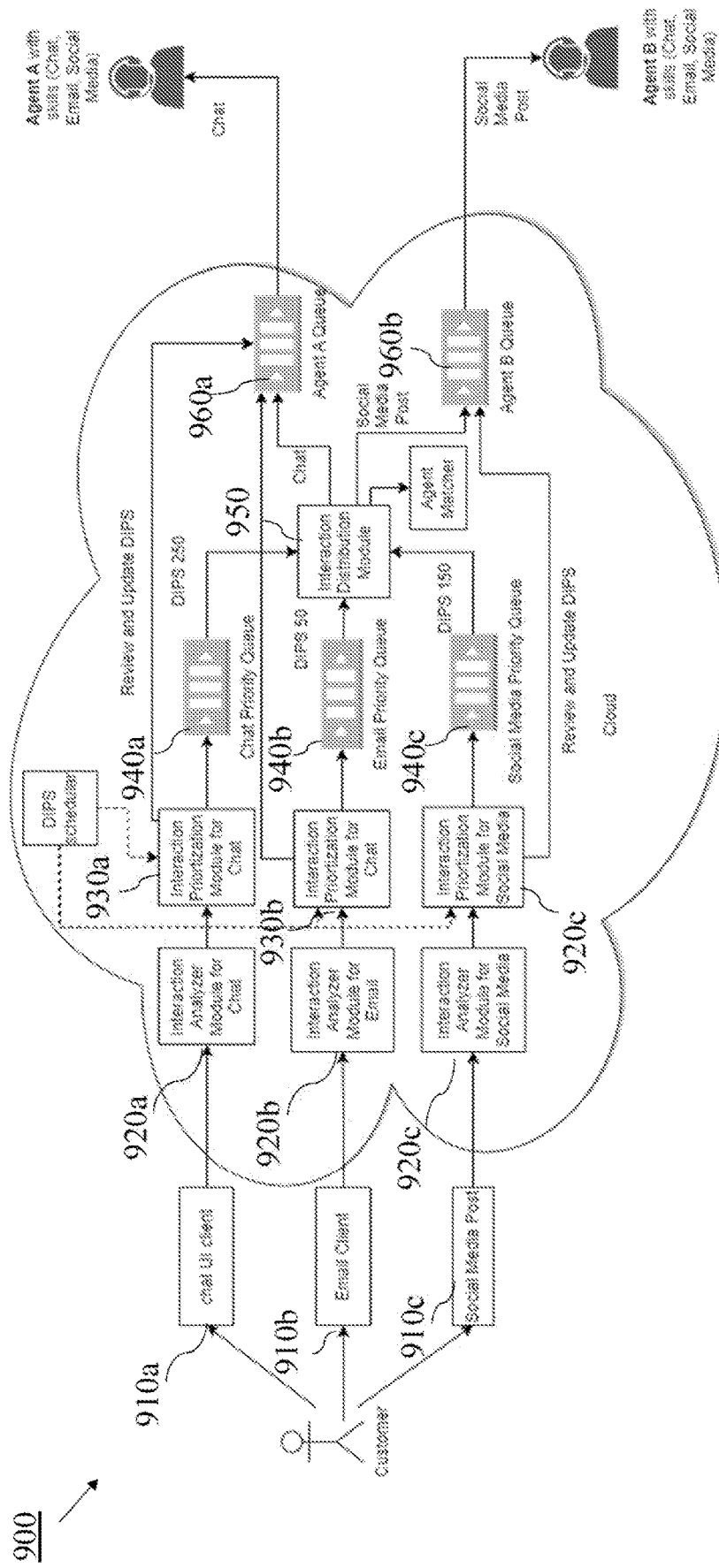
FIG. 9 is a schematic diagram of a system for dynamically prioritizing inbound interactions in a digital multi-channel contact center, in accordance with some embodiments of the present disclosure.

According to some embodiments of the present disclosure, the DIPS may be periodically updated while the inbound interaction is in the interaction-queue of the agent 960a-960b in FIG. 9 and presented to the agent, such that interactions having a higher DIPS than other interactions may be handled before a lower DIPS by the agent.

According to some embodiments of the present disclosure, the implementation of dynamic prioritization based on a calculated DIPS may reduce race conditions, which may arise if there are too many interactions in the queue 940a-940c in FIG. 9, as compared to the number of agents. In this situation if there is no priority assigned to interaction or if a static priority is assigned to the interaction the system may still fail to deliver the high priority interaction to the agent.

According to some embodiments of the present disclosure, for example, when customers approach the contact center via WhatsApp channel, then they commonly start the communication with sentences, such as "Hello I need to know about one product" or "Hello I need some information". These sentences may be followed by the actual product name which has high priority due to net worth but may be ignored when using static prioritization, and the interaction has been added to the queue with static or no prioritization. However, the customer who wanted to know about a high-net-worth product had to wait for a longer time than in a system, such as system 100A in Fig. A which may periodically calculate the DIPS of the interaction and may prioritize the interaction based on the net worth product name.

According to some embodiments of the present disclosure, the DIPS may be updated periodically while the inbound interaction is in the interaction-queue of the agent 960a-960b in FIG. 9, for example, based on retweets, and sharing of negative feedback in social media platforms.

According to some embodiments of the present disclosure, each DIPS value may have a corresponding preconfigured time-limit. When the DIPS may reach a value that corresponds to a first related time-limit, the inbound interaction may be moved to be first out of the interaction-queue of the agent and may be displayed via a supervisor dashboard.

According to some embodiments of the present disclosure, when the DIPS may reach a value that corresponds to a second related time-limit the inbound interaction may be routed to another agent, or to a supervisor.

According to some embodiments of the present disclosure, the prioritization module may calculate the DIPS of the inbound interaction based on one or more metadata parameters. The one of more metadata parameters may include at least one of: (i) critical service (ii) customer behavior; (iii) potential revenue; (iv) customer value (v) interaction influence; (vi) interaction timeline; (vii) customer experience; and (viii) one or more tags.

According to some embodiments of the present disclosure, the DIPS may be calculated by formula I:

$$\begin{aligned}\text{Digital Interaction Priority Score } (DIPS) = \quad &(\text{I})\\ \sum (\text{critical service category parameters} * W1) + \\ (\text{customer behavior category parameters} * W2) + \\ (\text{potential revenue category parameters} * W3) + \\ (\text{customer value category parameters} * W4) + \\ (\text{interaction influence category parameters} * W5) + \\ (\text{interaction timeline category parameters} * W6) + \\ (\text{customer experience category parameters} * W7),\end{aligned}$$

whereby:
critical service category parameters are aggregation of parameters that indicates if the inbound interaction is critical,
customer category parameters are aggregation of parameters that indicates customer sentiment and emotion in the interaction, potential revenue category parameters are aggregation of parameters that indicates if the subject of the interaction is preconfigured as high net worth,
customer value category parameters are aggregation of parameters that indicates if the customer has reverted to an original interaction, interaction influence is a parameter that indicates that the customer of the interaction is an influencer in social media, interaction timeline category parameters are aggregation of parameters that indicates if the interaction has reached a preconfigured deadline, customer experience category parameters are aggregation of parameters that indicates negative feedback or sentiment, W1 is a first preconfigured weight, W2 is a second preconfigured weight, W3 is a third preconfigured weight, W4 is a fourth preconfigured weight, W5 is a fifth preconfigured weight, W6 is a sixth preconfigured weight, and W7 is a seventh preconfigured weight.

According to some embodiments of the present disclosure, the critical service may be calculated by formula II, $$\prod_{i=0}^{n} (\text{Critical Service})i \quad \text{(II)}$$

whereby:

i is a first interaction tag value that has been configured as related to critical service, and the first interaction tag is '1' or '0'.

According to some embodiments of the present disclosure, for example, as shown in table 400 in FIG. 4A, the extracted first interaction parameter value, by the interaction analyzer module 120a, that has been configured as related to critical service, may be '1' when the interaction contains one of the following keywords, 'emergency', 'accident', 'hospital', 'hospitalization', 'SOS' and 'expiry' and the extracted value of the first interaction parameter value that has been configured as related to critical service may be '0' when the interaction doesn't have a keyword that has been configured as related to critical service.

According to some embodiments of the present disclosure, the customer value may be calculated by formula II:

$$\prod_{i=0}^{n} (\text{Customer Behaviour category parameter})i \quad \text{(III)}$$

whereby:

i is a second interaction category that has been configured as related to sentiment and emotion, and its value is calculated by aggregating the sentiment and emotion value. The interaction sentiment, value ranges from '1'-'5' and for emotion it ranges from '0'-'20'.

According to some embodiments of the present disclosure, for example, as shown in table 400 in FIG. 4A, the extracted second interaction category value, that has been configured as related to customer behavior by the interaction analyzer module 120a is aggregation of interaction sentiment and emotion value, interaction sentiment value may be in the range of '1'-'5' when the interaction sentiment is 'very positive', 'positive', 'neutral', 'negative' and 'very negative' correspondingly and interaction emotion value may be in the range of '0'-'20' when the interaction emotion is 'fear', 'upset', 'anger', 'sad', 'pleasant', 'happy', 'jolly' or 'neutral' as may be preconfigured.

According to some embodiments of the present disclosure, the potential revenue may be calculated by formula VI:

$$\prod_{i=0}^{n} (\text{Potential Revenue category parameter})i \quad \text{(VI)}$$

whereby:

i is a third interaction category that has been configured as related to potential revenue, and Potential revenue category parameters=High Revenue Product or Service value+High Monetary Value the third interaction category parameters are based on a mapping table.

According to some embodiments of the present disclosure, for example, as shown in table 400 in FIG. 4A, the extracted third interaction category value, that has been configured as related to potential revenue, by the interaction analyzer module 120a, may be based on a preconfigured mapping table of product or service and corresponding value.

According to some embodiments of the present disclosure, the customer value may be calculated by formula V:

$$\prod_{i=0}^{n} (\text{Customer Value category parameter})i \quad \text{(V)}$$

whereby:

i is a fourth interaction category that has been configured as related to verified customer or high value customer, the Customer value category parameters=Verified Customer value+Highly Valued Customer value and the value is '50 or '0' for verified customer and '100' or '0' for high value customer.

According to some embodiments of the present disclosure, for example, as shown in table 400 in FIG. 4A, the extracted fourth interaction category, that has been configured as related to customer value, by the interaction analyzer module 120a, may be '50' when the interaction is related to a verified customer and '0' otherwise. The extracted fourth interaction category, that has been configured as related to customer value may be '100' when the interaction is tagged as related to a high value customer and '0' otherwise. The extracted fourth interaction category, that has been configured as related to customer value may be 150 if the customer is a verified as well as high value customer.

According to some embodiments of the present disclosure, the customer value may be calculated by formula VI:

$$\prod_{i=0}^{n} (\text{Interaction influence})i \quad \text{(VI)}$$

whereby:

i is a fifth interaction tag that has been configured as related to interaction influence, and the fifth interaction tag is based on a mapping table of categories of number of followers and a value.

According to some embodiments of the present disclosure, for example, as shown in table 400 in FIG. 4B, the extracted fifth interaction category, that has configured as related to interaction influence, by the interaction analyzer module 120a, is an aggregation of parameters that indicates influence of the interaction on social media. The Interaction influence category parameters=FollowersCount+InfluentialPersonality+ResponsesCount+InfluencerResponsesCount.

The FollowersCount is a parameter that indicates that the customer of the interaction is an influencer in social media, which may be set to '50', the InfluentialPersonality is a parameter that indicates that the customer of the interaction is an influential person and can influence many people, which may be set to '200', the ResponsesCount is a parameter that indicates the count of likes, reposts, comments received on the interaction on social media, the InfluencerResponsesCount is a parameter that indicates the unique count of verified customers or influencers have reverted to the post.

According to some embodiments of the present disclosure, the interaction timeline starts when a customer initiates the interaction, until an agent handles the interaction, the interaction timeline may be calculated by formula VII:

$$\prod_{i=0}^{n} (\text{Interaction Timeline category parameters})i \quad \text{(VII)}$$

whereby:
i is a sixth interaction category that has been configured as related to interaction timeline, and interaction timeline category parameters=Time Elapsed parameter value+Interaction Nearing OLA Breach value, the Time Elapsed parameter value is set as per the time elapsed based on mapping, the Interaction Nearing OLA breach value indicates if the interaction is about to breach any operational level agreement (OLA). This value of this parameter is set based on mapping.

According to some embodiments of the present disclosure, for example, as shown in table 400 in FIG. 4B, the extracted sixth interaction category parameters, that has been configured as related to interaction timeline, by the interaction analyzer module 120*a*.

According to some embodiments of the present disclosure, the customer experience may be calculated by formula VIII:

$$\prod_{i=0}^{n} (\text{Customer Experience category parameters})i \quad \text{(VIII)}$$

whereby:
i is a seventh interaction category that has been configured as related to customer experience, the seventh interaction category parameter value is based on customer past experience and its value maybe '1' or '0'. The customer experience is retrieved from customer interactions database.

According to some embodiments of the present disclosure, interactions in the interaction-queue may be selected to be reordered based on the DIPS of the inbound interaction. The interaction-queue is a priority based queue which prioritizes interactions based on DIPS and places the interaction with highest DIPS at the front of the queue.

FIG. 1B schematically illustrates a high-level diagram of a system 100B for dynamically prioritizing inbound interactions in a digital multi-channel contact center, in accordance with some embodiments of the present disclosure.

According to some embodiments of the present disclosure, system 100B may include the components of system 100A in FIG. 1A, i.e., interaction analyzer module, interaction prioritization module and interaction distribution module.

According to some embodiments of the present disclosure, a prioritization module, such as interaction prioritization module 130*a* in FIG. 1A, and such as interaction prioritization module 130*b* may forward the DIPS to a module such as recommendation engine 150*b*.

According to some embodiments of the present disclosure, routing approach of push and inbox may be implemented for digital routing. Interactions may be prioritized, and then periodically re-prioritized base based on a calculated DIPS, which the interaction is in a digital channel type queue, such as digital cannel queue type 940*a*-940*c* in FIG. 9 or in the interaction-queue of the agent 960*a*-960*b* in FIG. 9.

According to some embodiments of the present disclosure, the recommendation engine may forward the DIPS to one or more components. For example, the recommendation engine 150*b* may forward the DIPS to an agent dashboard 160*a* to be presented to the agent via a display unit. In another example, the recommendation engine 150*b* may forward the DIPS to reporting module 160*b*. The reporting module may generate reports that may present the number of interactions in each priority category of 'High', 'Medium' and 'Low'. In yet another example, the recommendation engine 150*b* may forward the DIPS to a scheduling engine 160*d* for automated realignment of inbound interactions based on the priority that is determined by the DIPS. In yet another example, the recommendation engine 150*b* may forward the DIPS to a supervisor dashboard 160*c*.

Figure 1C:
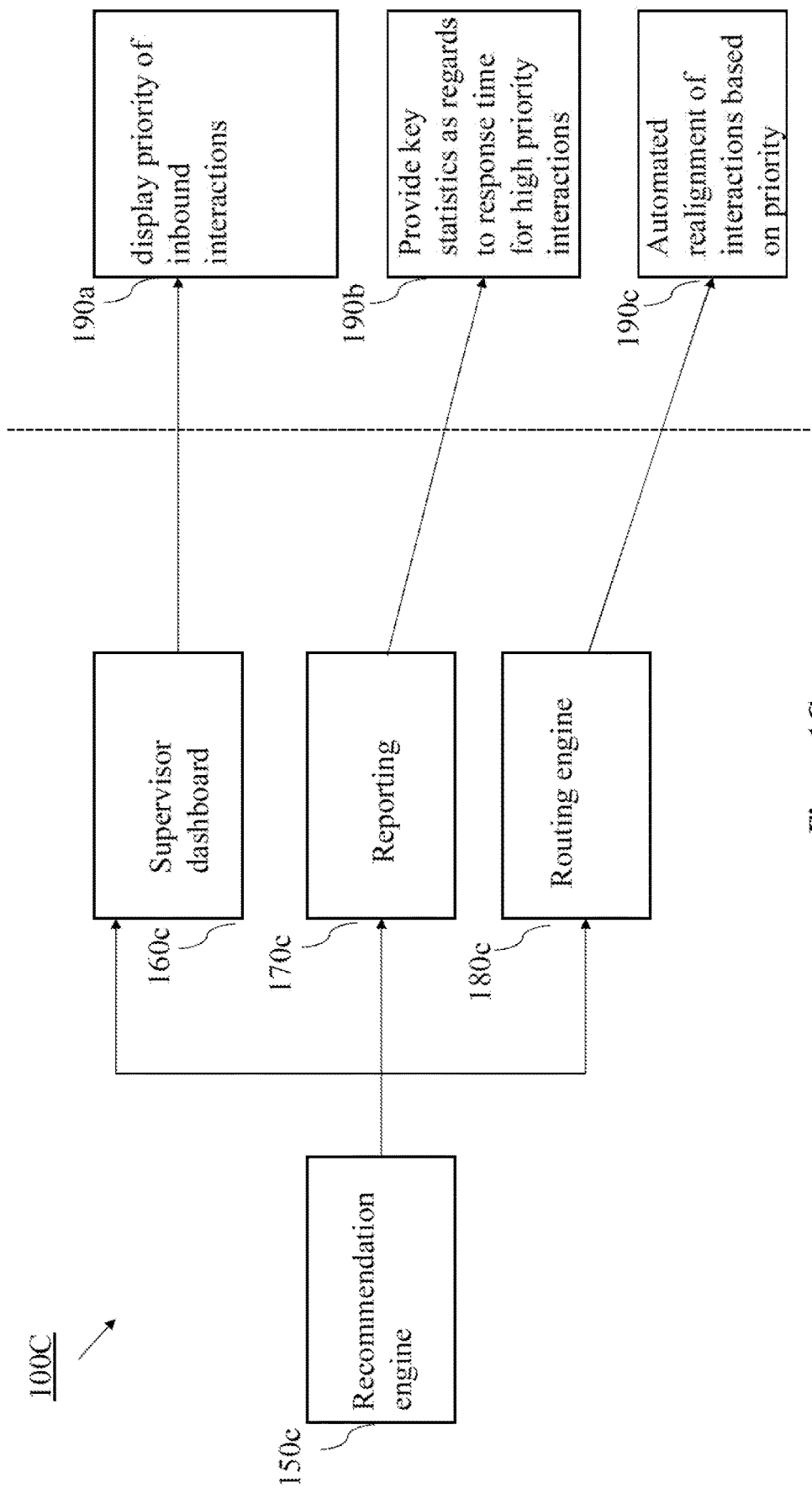

FIG. 1C schematically illustrates a high-level diagram of a system 100C for dynamically prioritizing inbound interactions in a digital multi-channel contact center, in accordance with some embodiments of the present disclosure.

According to some embodiments of the present disclosure, a recommendation engine, such as recommendation engine 150*c* and such as recommendation engine 150*b* in FIG. 1B, may forward the DIPS to a supervisor dashboard 160*c*, or for reporting 170*c* or to a routing engine 180*c*.

According to some embodiments of the present disclosure, the recommendation engine 150*c* may forward the DIPS to a supervisor dashboard 160*c* to display the priority of inbound interactions 190*a*, based on the DIPS.

According to some embodiments of the present disclosure, the recommendation engine 150*c* may forward the DIPS to a reporting module 170*c* to provide key statistics as to response time for high priority inbound interactions 190*b*, based on the DIPS.

Figure 2:
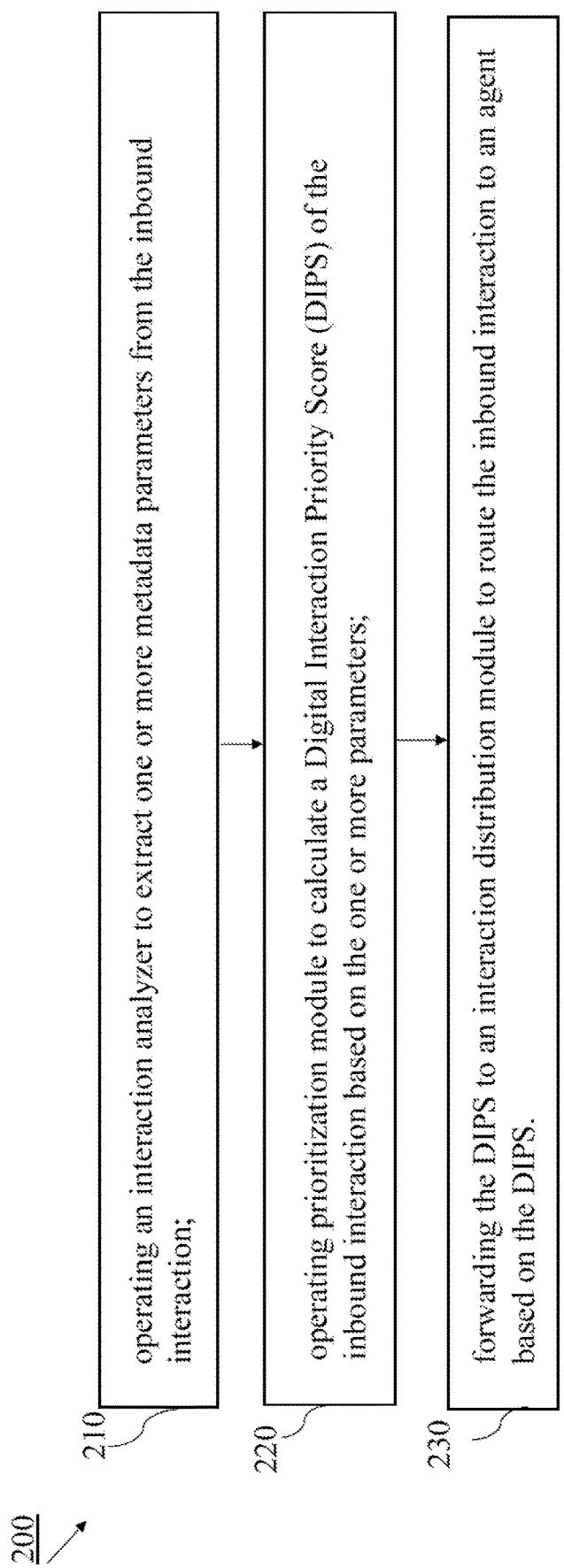
FIG. 2 is a high-level workflow of a computer-implemented method for dynamically prioritizing inbound interactions in a digital multi-channel contact center, in accordance with some embodiments of the present disclosure.

FIG. 2 is a high-level workflow 200 of a computer-implemented method for dynamically prioritizing inbound interactions in a digital multi-channel contact center, in accordance with some embodiments of the present disclosure.

According to some embodiments of the present disclosure, operation 210 comprising operating an interaction analyzer to extract one or more metadata parameters from the inbound interaction.

According to some embodiments of the present disclosure, operation 220 comprising operating prioritization module to calculate a Digital Interaction Priority Score (DIPS) of the inbound interaction based on the one or more parameters.

According to some embodiments of the present disclosure, operation 230 comprising forwarding the DIPS to an interaction distribution module to route the inbound interaction to an agent based on the DIPS.

According to some embodiments of the present disclosure, the DIPS is in an inverse relationship to a size of an interaction-queue of the agent that the inbound interaction has been routed to.

According to some embodiments of the present disclosure, the DIPS may be presented to the agent when the inbound interaction is added the interaction-queue of the agent, and then the DIPS may be periodically updated while the interaction is in a digital channel type queue, such as digital channel queue type 940a-940c in FIG. 9 or in the interaction-queue of the agent 960a-960b in FIG. 9.

According to some embodiments of the present disclosure, the computer-implemented method 200 may be implemented in a system such as system 100A in FIG. 1A.

Figure 3:
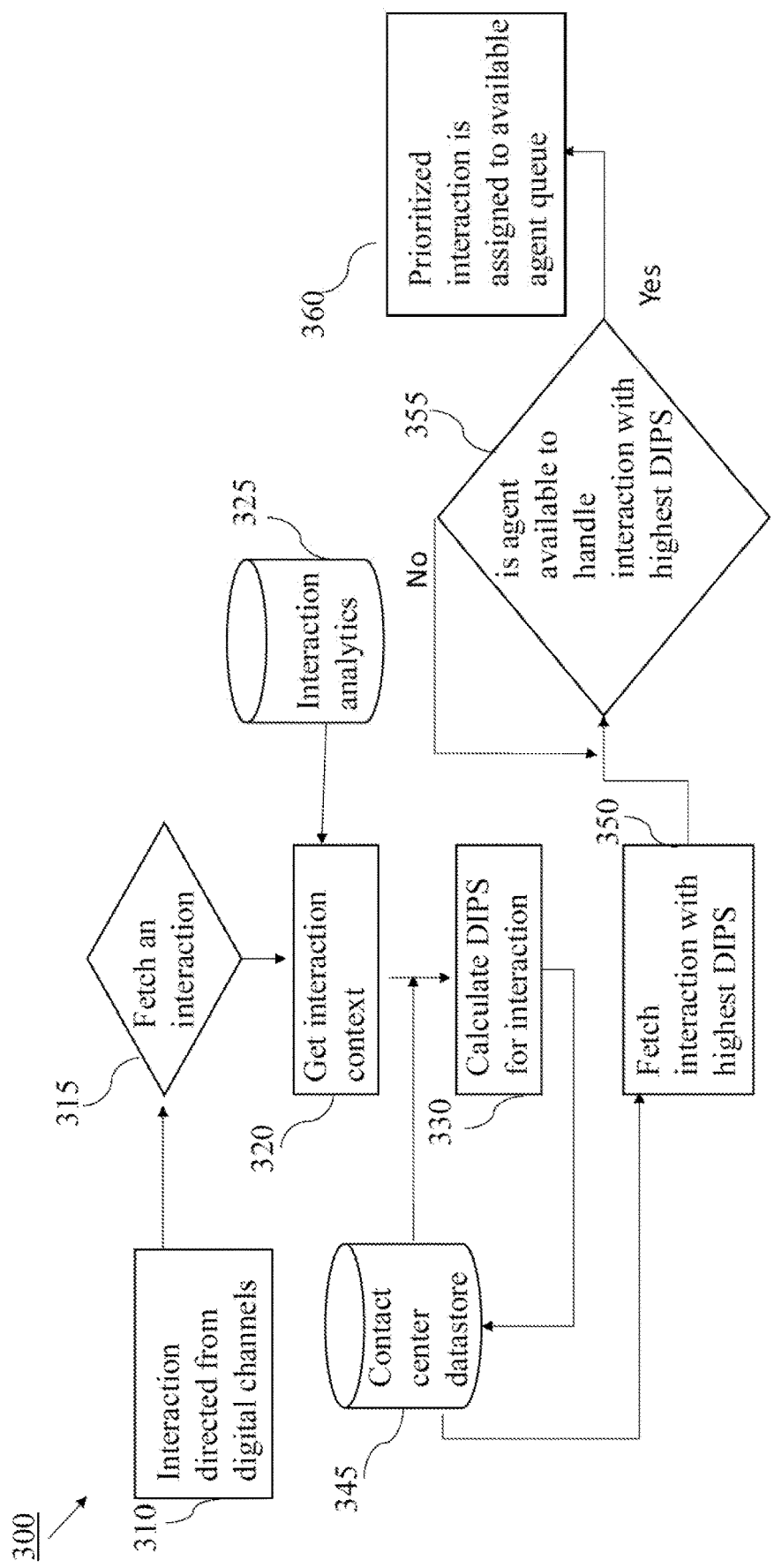
FIG. 3 is a high-level workflow of routing an inbound interaction based on a DIPS, in accordance with some embodiments of the present disclosure.

FIG. 3 is a high-level workflow of routing an inbound interaction based on a DIPS, in accordance with some embodiments of the present disclosure.

According to some embodiments of the present disclosure, in a system, such as system 100A in FIG. 1A, for all interactions which are directed from the digital channels 310, each interaction may be fetched 315 and get interaction context 320. For example, critical service, customer behavior, potential revenue, customer value, interaction influence, interaction timeline and customer experience, as shown in FIGS. 4A-4B. The interaction context, i.e., one or more metadata parameters of the inbound interaction, may be extracted by a module, such as interaction analyzer module 120a in FIG. 1A and maintained in interaction analytics 325.

According to some embodiments of the present disclosure, a module, such as interaction prioritization module 130a in FIG. 1A, may be operated to retrieve the interaction context from the interaction analytics database 325 and to calculate a Digital Interaction Priority Score (DIPS) of the inbound interaction 330 based on the one or more metadata parameters. Then, once a DIPS has been calculated, it may be stored in a contact center datastore 345 for reprioritization of the interaction based on the DIPS.

According to some embodiments of the present disclosure, an interaction distribution module, such as interaction distribution module 140a in FIG. 1A, may fetch interaction with highest DIPS 350 to next available agent 355.

According to some embodiments of the present disclosure, each agent has a skill assigned and a configuration as to how many concurrent skills an agent can handle. Based on this information the interaction is assigned to the agent. When there is an agent available to handle interaction with highest DIPS then the prioritized interaction is assigned to available agent queue 360. For example, agent skill configuration may be for concurrent assignment of interaction: Voice Call Support-1 interaction, WhatsApp Chat support-2 interactions and Email Support-3 interactions, which means that the agent can concurrently handle one voice call, two WhatsApp chats and three email supports. The agent can start working on the skills as per the assigned priority or initiate interaction with one or more interactions in parallel.

FIGS. 4A-4B show a table 400 of parameters extracted by interaction analyzer module, in accordance with some embodiments of the present disclosure.

According to some embodiments of the present disclosure, in a system, such as system 100A in FIG. 1A, the following parameters may be considered for the dynamic prioritization of interactions According to some embodiments of the present disclosure, the parameter critical service relates to interactions related to emergency services. The parameter customer behavior relates to interactions sentiment, such that interactions having negative sentiments may get prioritized as they may impact the Customer satisfaction score (CSAT). Interaction having negative emotions such as fear, upset, anger and the like may be prioritized as they might impact the CSAT.

According to some embodiments of the present disclosure, the parameter customer value may relate to interactions from a verified customer or interactions from customer identified as a valued customer. The parameter customer experience may relate to interactions that the customer had bad experience earlier with customer services on digital channels.

The parameter interaction timeline may relate to interactions have not been responded for specified period and to interactions that are about to breach the key performance indicator (KPI)s of the interaction. Each request raised by customer has an Operational Level Agreement (OLA), which means that the contact center has to respond to customer within specified time, it could be in an hour or in a few days. For example, an OLA could state that email has to be responded in 48 hours. If such interaction is not prioritized, then the OLA is not respected, and the contact center is not adhering to the terms and conditions outlined in the agreement, and breaching KPIs of the interaction.

According to some embodiments of the present disclosure, the parameter interaction influence may relate to interactions from highly influential personality or to interactions that verified customers or influencers have reverted to the original query, and to retweets or reactions or comments of interactions having negative content or bias or interactions having negative content shared multiple times.

According to some embodiments of the present disclosure, the parameter potential revenue may relate to interactions where a product or service monetary value may be discussed in the interaction or high net revenue product or service. The interaction may have the name of the product mentioned or an amount mentioned that can help in prioritization. For example, an interaction may include the following text "I need to know more about Apple Watch" the system, such as system 100A in FIG. 1A, may have configured Apple Watch as a high revenue product and when the name of the product may appear in the interaction, the priority of the interaction may change over time as more information may be entered by the customer. For chat and WhatsApp interactions the chatbot may ask the product name as part of initial interaction before it can be added to the interaction queue.

FIG. 5 is a high-level workflow 500 of dynamically prioritizing inbound interactions in a digital multi-channel contact center, in accordance with some embodiments of the present disclosure.

Figure 6:
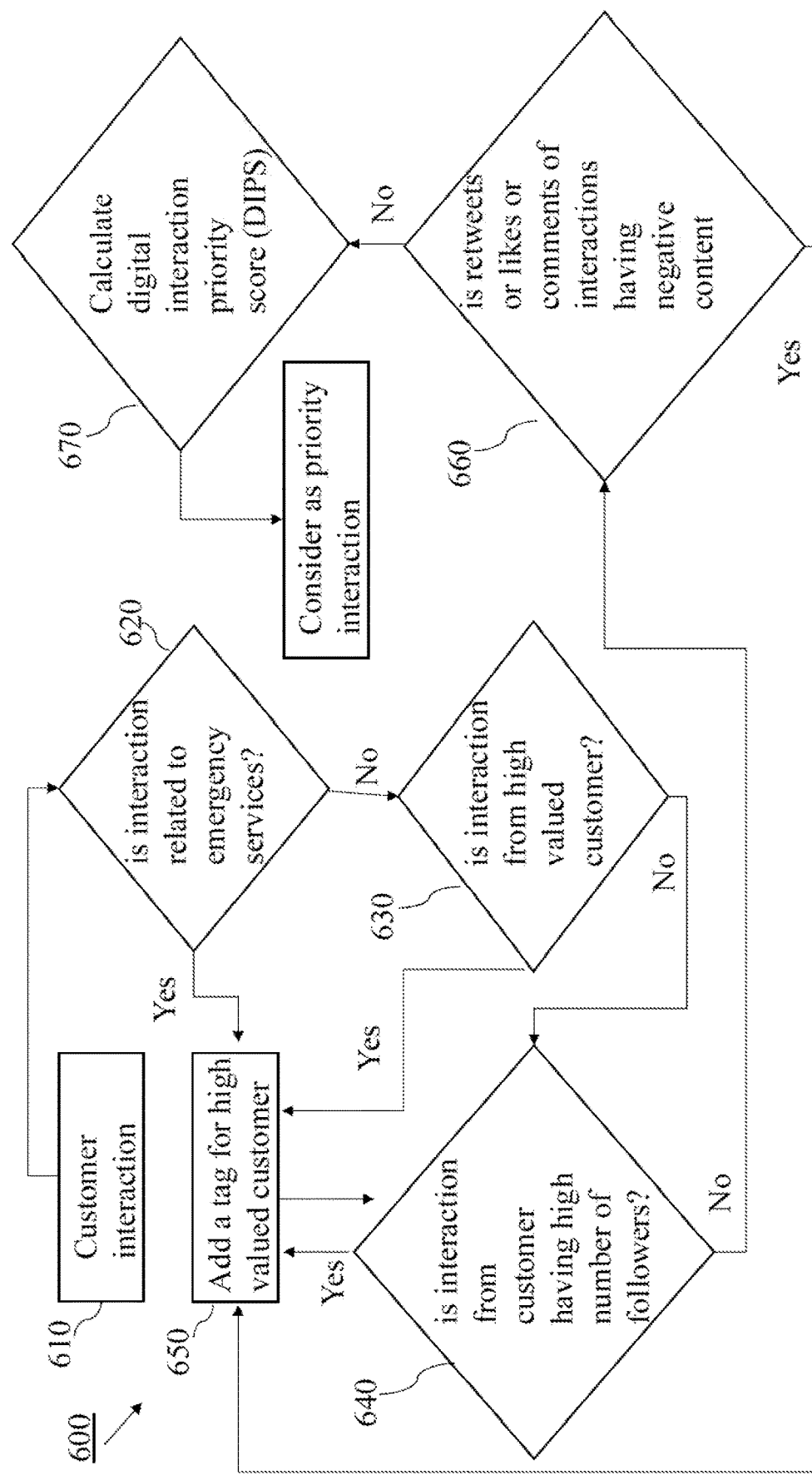
FIG. 6 is a high-level workflow of interaction analyzer module, in accordance with some embodiments of the present disclosure.

According to some embodiments of the present disclosure, when a customer interaction 510 may be received in a system, such as system 100A in FIG. 1A, an interaction analyzer module 520, such as interaction analyzer module 120a in FIG. 1A may analyse the interaction and extract metadata parameters for example, as shown in FIGS. 4A-4B for the interaction. The interaction analyzer module may operate, as shown in FIG. 6.

According to some embodiments of the present disclosure, a prioritization module, such as prioritization module 130a in FIG. 1A may be operated to calculate a Digital Interaction Priority Score (DIPS) of the inbound interaction 530, based on the extracted metadata parameters.

According to some embodiments of the present disclosure, when the DIPS is low, e.g., below a predefined threshold, then the interaction may not be considered as an emergency interaction 560. Otherwise, the interaction may be tagged as high priority interaction 540.

According to some embodiments of the present disclosure, all the interactions may be stored in the skill-based priority queue, such as queue 940*a*-940*c* in FIG. 9, and this queue may have the high priority interaction placed at the head of the queue.

According to some embodiments of the present disclosure, an interaction having a high priority may be assigned to an agent 550. The assignment of the interaction may be to an available agent or to an agent having shortest interaction-queue.

FIG. 6 is a high-level workflow 600 of interaction analyzer module, in accordance with some embodiments of the present disclosure.

According to some embodiments of the present disclosure, when a customer interaction 610 may be received in a system, such as system 100A in FIG. 1A, a module, such as interaction analyzer module 20*a* in FIG. 1A, may extract one or more metadata parameters. The interaction analyzer module may be operated to check if the interaction is related to emergency service 620. If the interaction is not related to emergency services, first interaction tag value that has been configured as related to critical service may be set to '0'. Then the interaction analyzer module may check if the interaction is from a high value customer 630. A fourth interaction tag that has been configured as related to verified customer or high value customer, may be set to '10' or '0' for verified customer and '100' or '0' for high value customer. The high value customer details and attributes are maintained in a database. When an interaction is received the handle is checked in the customer point of contact database where there are flags added which indicate if the customer is a verified customer, is a high value customer or not. This database is kept updated by contact center from time to time.

Figure 11E:
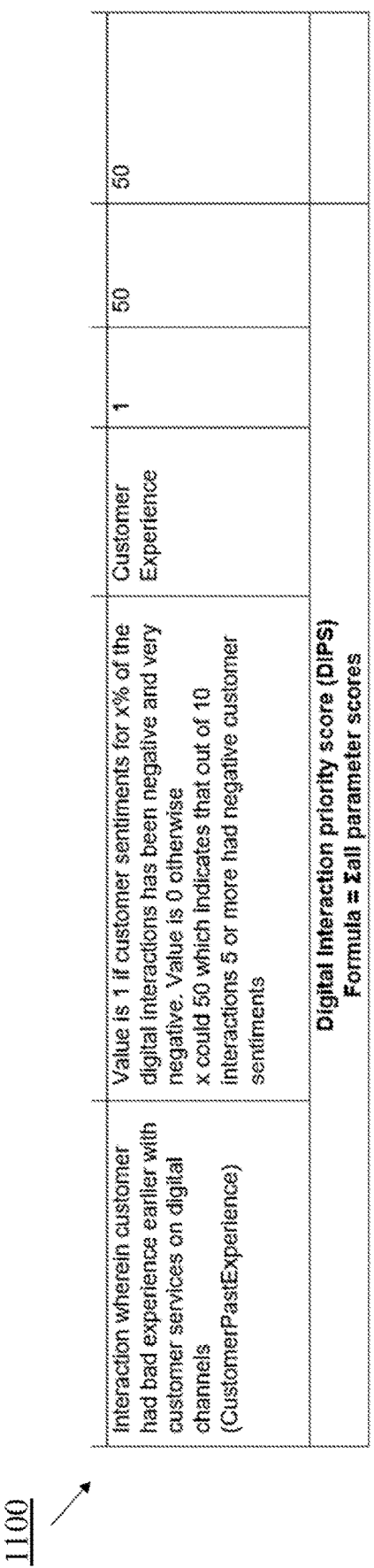
Figure 12E:
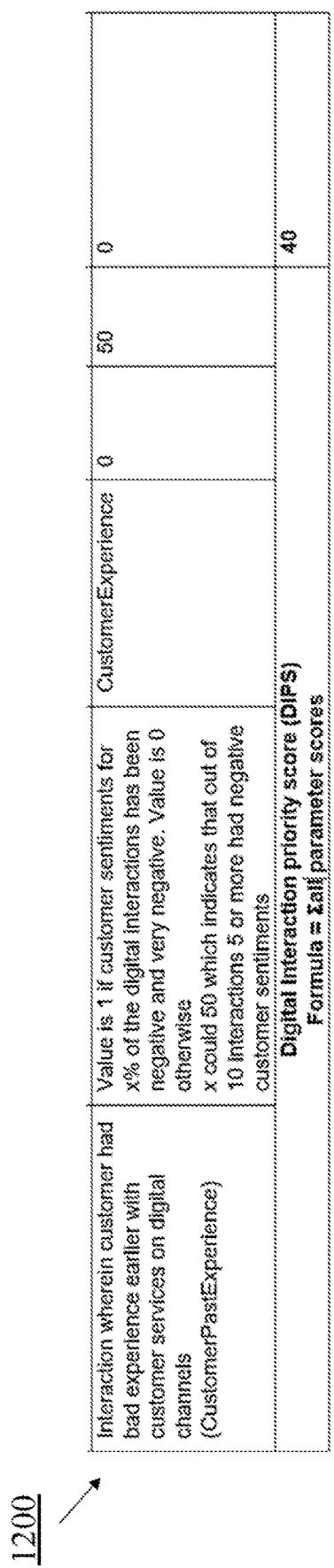

According to some embodiments of the present disclosure, if the interaction is not related to a high valued customer, then the interaction analyzer module may check if the interaction is from a customer having high number of followers. In interactions from channels that provide information on number of followers such as LinkedIn®, Facebook®, Instagram®, when an interaction is received on these channels an API of the particular channel may be used to get the information about the number of followers. If the interaction is from a customer having high number of followers, then a fifth interaction tag that has been configured as related to interaction influence may be add to the instruction 650 and the tag value may be set based on a mapping table of categories of number of followers and a value, as shown for example, in FIG. 11B.

According to some embodiments of the present disclosure, if the interaction relates to emergency services or to a high valued customer, then a tag for high valued customer may be added to the interaction 650. When the interaction is not from a customer having high number of followers e.g., below a predefined threshold, the interaction analyzer module may check if retweets or likes of comments of interactions having negative content 660. If a content has negative sentiments, it is identified as negative content. When the interaction has negative content or bias a tag for high valued customer may be add to the instruction 650. Interaction Influence has parameter named ResponsesCount which is calculated using the formula: value=sentiment score X count of reactions, retweets, comments*0.1. When the content is negative the value increases thereby increasing the priority.

According to some embodiments of the present disclosure, when the interaction doesn't have negative content or bias, a Digital Interaction Priority Score (DIPS) may be calculated, and when the DIPS may be above a preconfigured threshold, the customer interaction 610, may be considered as priority interaction. All interactions may not have negative content, but there could be other parameters that influence the priority. Contact Centers may define threshold to indicate the interaction priority category as 'High', 'Medium' or 'Low' priority.

Figure 7:
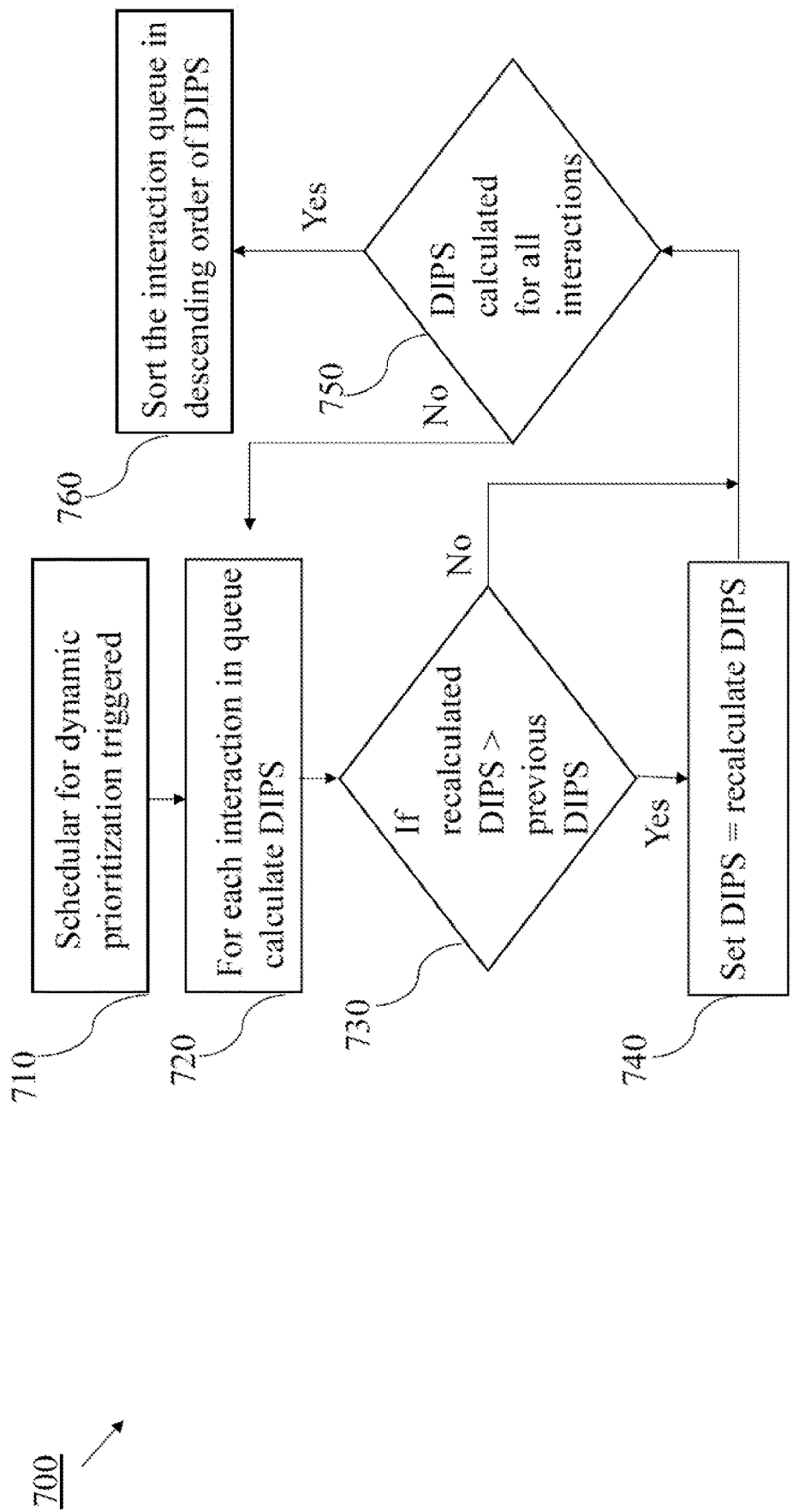
FIG. 7 is a high-level workflow of reprioritization of an inbound interaction, in accordance with some embodiments of the present disclosure.

FIG. 7 is a high-level workflow 700 of reprioritization of an inbound interaction, in accordance with some embodiments of the present disclosure.

According to some embodiments of the present disclosure, in a system, such as system 100A, the process of reprioritization of inbound interactions may ensure that digital interactions are prioritized dynamically so that high priority interactions are responded at a faster pace as compared to low priority interactions. The DIPS may be calculated periodically based upon various parameters for the interaction in queue, e.g., a dedicated queue of the digital channel type 940*a*-940*c* in FIG. 9, and when the interaction is in agent's queue 960*a*-960*b* in FIG. 9, thereby achieving dynamic prioritization.

According to some embodiments of the present disclosure, a schedular for dynamic prioritization may be triggered 710 and for each interaction in both digital channel type queue and agent's queue, the DIPS may be calculated 720. In a system, such as system 100A, an inbound interaction may be reprioritized 740, when a checking of a recalculated DIPS is higher than previously calculated DIPS 730, is positive. Once the DIPS has been calculated for all interactors, the interactions may be sorted in descending order based on the DIPS. A single schedular or multiple schedulers may be implemented to calculate the DIPS of each interaction.

According to some embodiments of the present disclosure, if the recalculated DIPS is not higher than previously calculated DIPS, a checking of DIPS has been calculated for all interactions 750 may be operated. When the DIPS has been calculated to all interactions then, the interactions may be sorted in descending order based on the DIPS 760. If the DIPS has not been calculated to all interactions, then, a checking if a recalculated DIPS is higher than previously calculated DIPS 730, may be operated.

Figure 8A:
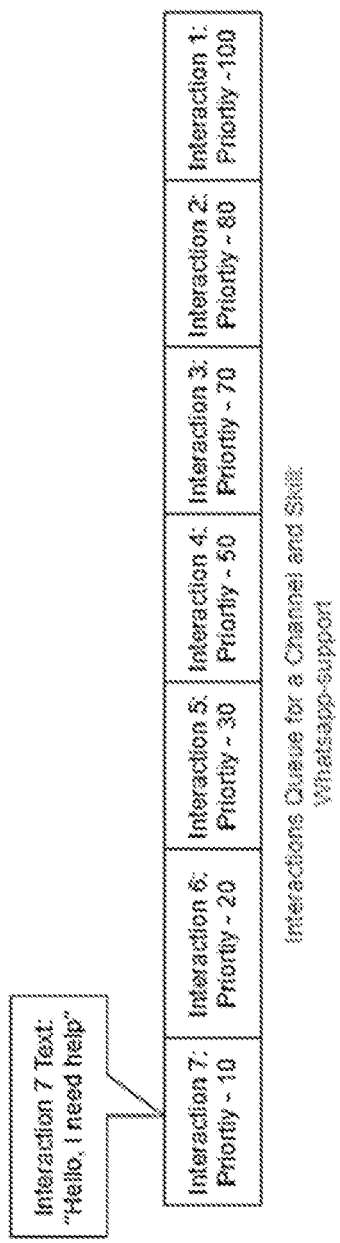
FIGS. 8A-8B are simulations of an interaction arriving when agents are busy, in accordance with some embodiments of the present disclosure.

FIG. 8A is a simulation of an interaction arriving when all agents are busy when using static prioritization, in accordance with some embodiments of the present disclosure.

When static prioritization is used for routing interactions, even if there is an update on the interaction priority, for example, interaction 7, the customer initially texted "Hello, I need help", then, the priority of the interaction remains the same, even if later on after a few minutes, the customer of interaction 7 is texting "Hello, I need help, it's an emergency", while the agent works on an interaction with lower priority which may frustrate the customer with the higher priority that is waiting in queue to receive service. However, when dynamic prioritization is implemented, for example, in a system, such as system 100A in FIG. 1A, the agent may work on the higher priority interaction, such as emergency interaction, as shown in FIG. 8B.

Figure 8B:
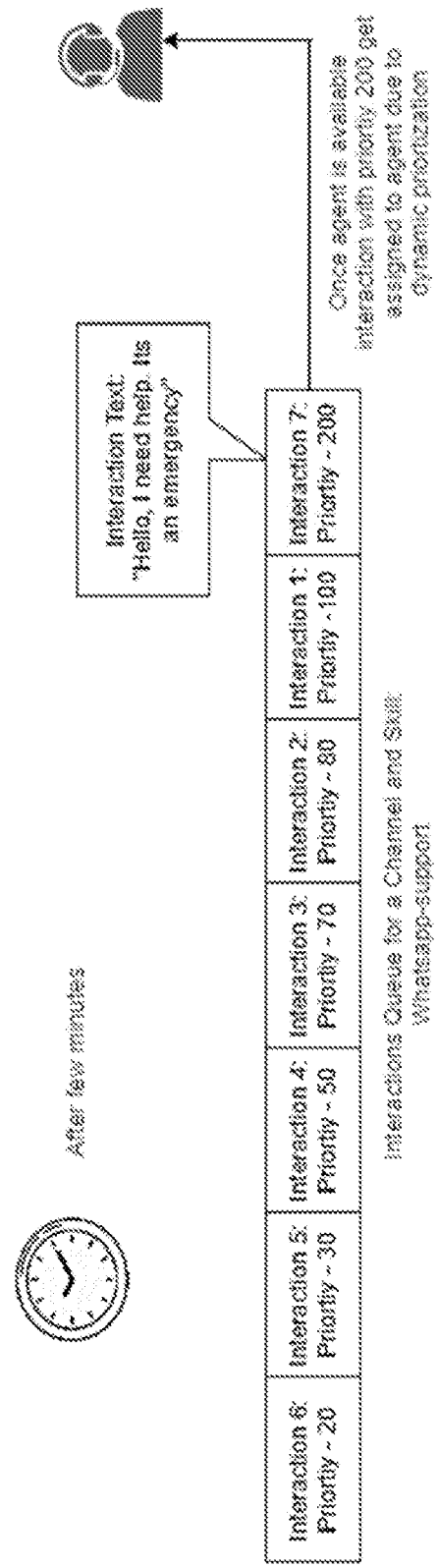

FIG. 8B is a simulation of an interaction arriving when all agents are busy when using dynamic prioritization, in accordance with some embodiments of the present disclosure.

According to some embodiments of the present disclosure, in a system, such as system 100A in FIG. 1A, in a situation as shown in FIG. 8A, when an agent slot is available for a given skill, then an interaction, such as interaction 7 may be selected for that skill which has highest DIPS where DIPS may be calculated periodically at predefined intervals. The DIPS may be calculated for each interaction and as per the score the interactions may be prioritized and routed.

FIG. 9 is a schematic diagram of a system 900 for dynamically prioritizing inbound interactions in a digital multi-channel contact center, in accordance with some embodiments of the present disclosure.

According to some embodiments of the present disclosure, in a system, such as system 100A in FIG. 1A, when a customer approaches to a contact center via a digital channel, such as via chat UI client 910a, email client 910b, or social media post 910c, a module, such as interaction analyzer module 120a in FIG. 1A, which may be operating in a cloud-based environment, may extract one or more metadata from the interaction. For each digital channel type, there may be a dedicated interaction analyzer module 920a-920c. The interaction may be captured in the form of InteractionRecord with several interaction related attributes identified.

According to some embodiments of the present disclosure, the InteractionRecord may be implemented, for example by a JavaScript Object Notation (Json) document. The Json document, may be used to store the information of the interaction and its metadata parameters. The metadata parameters may be generated per social media post or email or per session in case of messaging apps.

According to some embodiments of the present disclosure, the InteractionRecord may include the following parameters. The queueId which is the Id of the queue where the interaction may be stored before it is allocating to an agent 940a-940c. The customerId which is the Id of customer if a known customer interacts with the contact center otherwise it may by nulled. The customerHandle which is the digital media through which the customer interacts for Facebook®, Twitter®, Instagram®. For an interaction via email, the customerHandle may be the email address of the customer. Other remaining parameters may be the interaction metadata.

According to some embodiments of the present disclosure, the InteractionQueueRecord may be implemented, for example by a resizable array such as arraylist containing the InteractionRecordId's. The InteractionQueueRecord may include the list of all the unassigned interactions from the same customerHandle on the same channel.

According to some embodiments of the present disclosure, the InteractionQueueRecord may be used to store the interactions per customerHandle in a queue 940a-940c, till the interactions are assigned to an agent. Once an interaction has been assigned to an agent, the interaction may be routed by an interaction distribution module, such as interaction distribution module 140a in FIG. 1A, from the channel queue 940a-940c to an agent interaction-queue. The queue e.g., 940a-940c may be a priority-based queue that ensures that the interaction with the highest DIPS is placed to be assigned to an agent before other interactions. The queue. e.g., 940a-940c may be created per channel or per skill within the channel.

According to some embodiments of the present disclosure, the interaction analyzer module 920a-920c may forward the extracted one or more metadata parameters to a prioritization module 930a-930c, which may operate in a cloud-based environment. The prioritization module 930a-930c, may be a module, such as interaction prioritization module 130a in FIG. 1A, that may calculate the DIPS of the interaction based on parameters extracted by the interaction analyzer module 120a.

According to some embodiments of the present disclosure, each prioritization module may be a dedicated module for each interaction digital channel type. The prioritization module 930a-930c may place the interaction in a dedicated queue of the digital channel type 940a-940c. In the queue 940a-940c the interaction may be stored in the form of InteractionQueueRecord.

According to some embodiments of the present disclosure, periodically, when the interaction is in the digital channel type queue, the DIPS may be recalculated, thus maintaining highest priority interaction at the top of the queue.

FIG. 10 is an example 1000 of inbound interaction routing based on DIPS, in accordance with some embodiments of the present disclosure.

According to some embodiments of the present disclosure, in a system, such as system 100A in FIG. 1A, interactions with higher DIPS score may be prioritized in the digital channel type queue and such interactions may also be prioritized while assigned to agents by a module, such as interaction distribution module 140a in FIG. 1A.

FIGS. 11A-11E are a table 1100 of parameters which are used for dynamic prioritization of inbound interactions, in accordance with some embodiments of the present disclosure.

According to some embodiments of the present disclosure, in a system, such as system 100A in FIG. 1A, interactions obtaining keywords, such as for example, 'emergency', 'accident', 'hospital', 'hospitalization', 'SOS', 'expiry' may be assigned a first interaction tag value that has been configured as related to critical service which may be set to '1' by the interaction analyzer module, such as interaction analyzer module 120a in FIG. 1A. The W1, first preconfigured weight may be set to '200'. When the interaction doesn't obtain these keywords the first interaction tag value that has been configured as related to critical service may be set to '0'.

According to some embodiments of the present disclosure, optionally, when the interaction has more than one tag the value of the first interaction tag value that has been configured as related to critical service may be set to a sum of all tags. For example, when the interaction relates to an emergency and accident the value of the first interaction tag value that has been configured as related to critical service may be set to '2'. If more than one keywords related to critical service appear then the emergency parameter value may be sum of the value assigned to each of the keyword. For example, when the keyword emergency appears once and no other keyword related to critical service is present in the interaction the emergency parameter value may be set to '1'. When along with emergency, the accident keyword is also found and it has value set to '1', then the emergency parameter value may be set to '2'. Similarly, each keyword may have a specific value by default it will be '1'. Based on the unique occurrences of the critical service keywords the emergency parameter value may be calculated.

According to some embodiments of the present disclosure, customer behavior may be a parameter that may indicate customer sentiment and emotion in the interaction. The interaction may be assigned a second interaction tag that has been configured as related to sentiment or emotion, by the interaction analyzer module, such as interaction analyzer module 120a in FIG. 1A. The second interaction tag value may be an aggregation of second interaction category parameters that has been configured as related to sentiment and emotion. The second interaction category includes the following parameters: interaction sentiment which has values from '1' to '5', and interaction emotion which has values '0' to '20' based on the interaction emotion.

According to some embodiments of the present disclosure, the second interaction tag value may be set by interaction prioritization module 130a in FIG. 1A, to '1'-'5' based on identified sentiment which may be for example, 'very positive', 'positive', 'neutral', 'negative' and 'very negative'. The W2, second preconfigured weight may be set to '10'.

According to some embodiments of the present disclosure, the second interaction tag value may be set by interaction prioritization module 130a in FIG. 1A, to '6'-'20' based on identified emotion which may be for example, 'fear', 'upset', 'anger', 'sad', 'pleasant', 'happy', 'jolly', and 'neutral'. The W2, second preconfigured weight may be set to '10'.

According to some embodiments of the present disclosure, a third interaction tag that has been configured as related to potential revenue may be set a preconfigured value to an interaction which has been determined based on a product having an associated prioritization value, as related high net revenue product or service. For example, in a car company such as Ford®, the third interaction tag that has been configured as related to potential revenue may be set based on a mapping table of cars and corresponding value. The W3, third preconfigured weight may be set to '1'.

According to some embodiments of the present disclosure, a fourth interaction tag that has been configured as related to Customer Value is an aggregation of verified customer value and high value customer value, where if customer is verified then value may be set to '10' else its '0' and for highly valued customer the value may be '100' or '0'. The W4, fourth preconfigured weight may be set to According to some embodiments of the present disclosure, a fifth interaction tag that has been configured as related to interaction influence, may be set based on a mapping table of categories of number of followers and a value. The W5, fifth preconfigured weight may be set to '1'.

According to some embodiments of the present disclosure, a sixth interaction tag that has been configured as related to interaction timeline, wherein the sixth interaction tag value is based on a timeline mapping table. The W6, sixth preconfigured weight may be set to '1'.

According to some embodiments of the present disclosure, a seventh interaction tag that has been configured as related to customer experience and may be set to '1' or '0'. The tag may be set to '1' when the customer had 'negative' or 'very negative' sentiment in a preconfigured percent of previous interactions during a specified period of time. The W7, seventh preconfigured weight may be set to '50'.

FIGS. 12A-12E show is a simulation 1200 of DIPS calculation of an inbound interaction with a low priority, in accordance with some embodiments of the present disclosure.

According to some embodiments of the present disclosure, in a system, such as system 100A in FIG. 1A, the DIPS of an interaction may be calculated as follows:

Digital Interaction Priority Score $(DIPS) =$ $\sum$ (critical service category parameters $* W1$) +

(customer behavior category parameters $* W2$) +

(potential revenue category parameters $* W3$) +

-continued (customer value category parameters $* W4$) +

(interaction influence category parameters $* W5$) +

(interaction timeline category parameters $* W6$) +

(customer experience category parameters $* W7$) =

$\sum (0 * 200) + ((3 + 0) * 10) + ((0 + 0) * 10) + ((10 + 0) * 1) +$ $((0 + 0 + 0 + 0) * 1) + ((0 + 0 + 0 + 0) * 1) + (0 * 50) = 40.$ According to some embodiments of the present disclosure, when the interaction has been determined as no critical and thus the first interaction tag value that has been configured as related to critical service has been set to '0', and W1 is preconfigured to '200', the sentiment in the interaction has been determined as neutral, thus the second interaction parameter related to sentiment that has been configured as related to sentiment is set to '3', e.g., based on table 110 in FIGS. 11A-11E, W2 is preconfigured to 10, and the emotion in the interaction has been determined as neutral, thus the second interaction parameter related to emotion that has been configured as related to emotion is set to '0', e.g., based on table 110 in FIGS. 11A-11E, W2 is preconfigured to '10'.

According to some embodiments of the present disclosure, when the interaction may not relate to potential revenue, the third interaction parameter category related to High Revenue Product or Service that has been configured as related to potential revenue may be set to '0', and otherwise based on a mapping table. When the interaction may be from a verified customer the fourth interaction category that has been configured as related to verified customer or high value customer, may be set to '10' or otherwise to '0', and '100' or '0' for high value customer.

According to some embodiments of the present disclosure, when the interaction is not from highly influenced customer then the fifth interaction parameter category that has been configured as related to interaction influence may be set to '0'.

FIGS. 13A-13E show a simulation 1300 of reprioritization of high priority inbound interaction based on a calculated DIPS, in accordance with some embodiments of the present disclosure.

According to some embodiments of the present disclosure, in a system, such as system 100A in FIG. 1A, the DIPS reprioritization of the interaction while the interaction is waiting in queue, may be based on a calculation according to the parameters in FIGS. 13A-13E in formula I which may be equal to 550.

Figure 14:
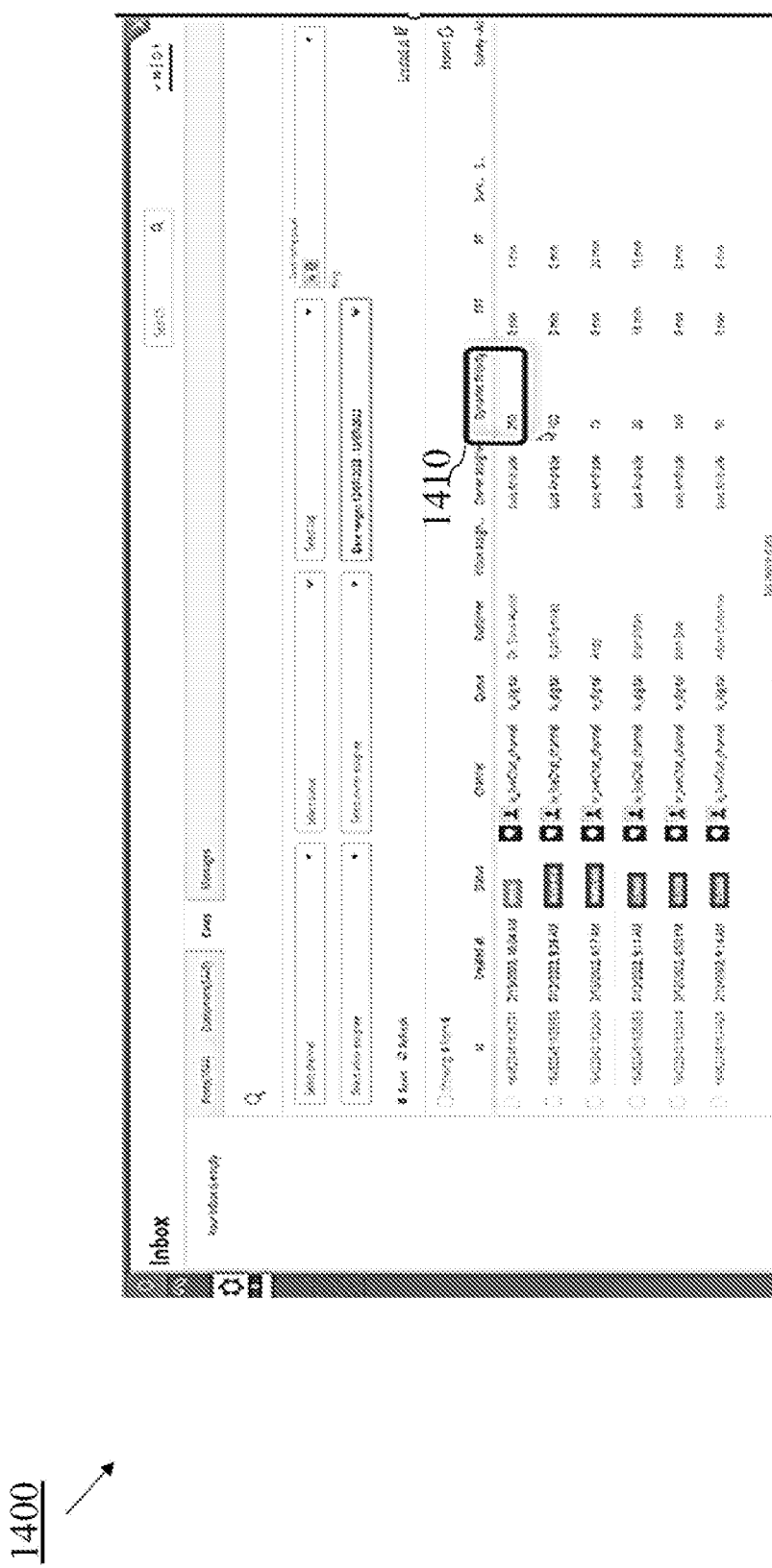
FIG. 14 shows an example of a User Interface (UI) with dynamic interaction prioritization score, in accordance with some embodiments of the present disclosure.

FIG. 14 shows an example 1400 of a User Interface (UI) with dynamic interaction prioritization score, in accordance with some embodiments of the present disclosure.

According to some embodiments of the present disclosure, UI 1400 shows how Dynamic Priority value 1410, e.g., DIPS, has changed from a lower value to a higher value over time, in a system, such as system 100A in FIG. 1A. Thus, ensuring that digital interactions are prioritized dynamically so that high priority interactions may be routed for response at a faster pace as compared to low priority interactions.

According to some embodiments of the present disclosure, the Dynamic Priority 1410 may be calculated periodically based on formula I for the interaction in a channel digital type queue. e.g., digital channel type queue 940a-940c, as shown in FIG. 9, thereby achieving dynamic prioritization.

FIGS. 15A-15D show an example 1500 of extracted metadata parameters by an interaction analyzer module, in accordance with some embodiments of the present disclosure.

According to some embodiments of the present disclosure, metadata may be captured and added to an interaction based on parameter and additional information.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computer-implemented method for dynamically prioritizing inbound interactions in a digital multi-channel contact center comprising:
   for each inbound interaction via a digital channel:
   (i) operating an interaction analyzer module to extract one or more metadata parameters from the inbound interaction;
   (ii) operating a prioritization module to calculate a Digital Interaction Priority Score (DIPS) of the inbound interaction based on the one or more metadata parameters; and
   (iii) forwarding the DIPS to an interaction distribution module to route the inbound interaction to an agent based on the DIPS,
      wherein the DIPS is periodically updated until the interaction is assigned to the agent.

2. The computer-implemented method of claim 1, wherein the DIPS is presented to the agent when the inbound interaction is added the interaction-queue of the agent.

3. The computer-implemented method of claim 1, wherein when the DIPS reaches a value that corresponds to a first related time-limit the inbound interaction is moved to be first out of the interaction-queue of the agent.

4. The computer-implemented method of claim 3, wherein each DIPS value has a preconfigured time-limit.

5. The computer-implemented method of claim 3, wherein the DIPS is displayed via a supervisor dashboard.

6. The computer-implemented method of claim 3, wherein when the DIPS reaches a value that corresponds to a second related time-limit the inbound interaction is routed to another agent or to a supervisor.

7. The computer-implemented method of claim 1, wherein the one or more metadata parameters include at least one of: (i) critical service (ii) customer behavior; (iii) potential revenue; (iv) customer value (v) interaction influence; (vi) interaction timeline; (vii) customer experience; and (viii) one or more tags.

8. The computer-implemented method of claim 7, wherein the DIPS is calculated by formula I:

$$\text{Digital Interaction Priority Score (DIPS)} = \tag{I}$$
$$\sum (\text{critical service category parameters} * W1) +$$
$$(\text{customer behavior category parameters} * W2) +$$
$$(\text{potential revenue category parameters} * W3) +$$
$$(\text{customer value category parameters} * W4) +$$
$$(\text{interaction influence category parameters} * W5) +$$
$$(\text{interaction timeline category parameters} * W6) +$$
$$(\text{customer experience category parameters} * W7),$$

whereby:
critical service category parameter is a parameter that indicates if the inbound interaction is critical,
customer behavior category parameters are aggregation of parameters that indicates customer sentiment and emotion in the interaction,
potential revenue category parameters are parameters that indicates if the subject of the interaction is preconfigured as high net worth,
customer value category parameters are aggregation of parameters that indicates if the customer is verified customer or a highly valued customer or both,
interaction influence category parameters are aggregation of parameters that indicates influence of the interaction on social media,
interaction timeline category parameters are aggregation of parameter that indicates the timeline of the interaction and if it is nearing an operational level or service level agreement deadline,
customer experience is a parameter that indicates negative feedback or sentiment,
W1 is a first preconfigured weight,
W2 is a second preconfigured weight,
W3 is a third preconfigured weight,
W4 is a fourth preconfigured weight,
W5 is a fifth preconfigured weight,
W6 is a sixth preconfigured weight, and
W7 is a seventh preconfigured weight.

9. The computer-implemented method of claim 8, wherein the critical service is calculated by formula II, $$\prod_{i=0}^{n} (\text{Critical Service category parameter}(s))i \quad \text{(II)}$$

whereby:
i is a first interaction category that has been configured as related to critical service, wherein the interaction category consists of Emergency interaction parameter whose value is '1' or '0'.

10. The computer-implemented method of claim 8, wherein the customer value is calculated by formula III:

$$\prod_{i=0}^{n} (\text{Customer Behaviour category parameter}(s))i \quad \text{(III)}$$

whereby:
i is a second interaction category that has been configured as related to interaction sentiment and emotion,
wherein the second interaction category parameter is an aggregation of interaction sentiment value and interaction emotion value, and
wherein interaction sentiment value ranges from '1'-'5' and interaction emotion value has values from range '0' to '20' based on interaction emotion.

11. The computer-implemented method of claim 8, wherein the potential revenue is calculated by formula VI:

$$\prod_{i=0}^{n} (\text{Potential Revenue category parameter}((s)i \quad \text{(VI)}$$

whereby:
i is a third interaction category that has been configured as related to potential revenue, wherein the third interaction category parameters is an aggregation of High Revenue Product or Service value and High Monetary Value parameters and their value is based on a first preconfigured mapping table.

12. The computer-implemented method of claim 8, wherein the customer value is calculated by formula V:

$$\prod_{i=0}^{n} (\text{Customer Value category parameter}(s))i \quad \text{(VI)}$$

whereby:
i is a fourth interaction category that has been configured as related to verified customer or high value customer or both,
wherein the fourth interaction category is aggregation of verified customer value and highly valued customer value, and
wherein verified customer value is set to '10' when the customer of the interaction has been identified as a verified customer and highly valued customer value is set to '100' when the customer is marked as highly valued customer by the contact center.

13. The computer-implemented method of claim 8, wherein the customer value is calculated by formula VI:

$$\prod_{i=0}^{n} (\text{Interaction influence category parameter}(s))i \quad \text{(VI)}$$

whereby:
i is a fifth interaction category that has been configured as related to interaction influence on social media, and wherein the fifth interaction category is aggregation of: followers count parameter, Influential Personality parameter, Responses Count parameter and Influencer Responses Count parameter,
followers count parameter indicates that the customer of the interaction is an influencer in social media, which is based on a second preconfigured mapping table,
influential personality parameter indicates that the customer of the interaction is an influential person, which is set based on a third preconfigured mapping table,
responses count parameter indicates the count of likes, reposts, comments received on the interaction on social media and is value is set based on:
responses count value=sentiment score of the interaction* (count of likes and retweets/reposts and comments) *0.1,
influencer responses count is a parameter that indicates the unique count of verified customers or influencers that have reverted to the social media interaction.

14. The computer-implemented method of claim 8, wherein the interaction timeline is calculated by formula VII:

$$\prod_{i=0}^{n} (\text{Interaction Timelines category parameters})i \quad \text{(VII)}$$

whereby:
i is a sixth interaction category that has been configured as related to interaction timeline parameters,
wherein the sixth interaction category is based on timeline of the interaction and parameters related to Operational Level Agreement (OLA) or Service Level Agreement (SLA) deadline, and
wherein the interaction timeline parameter and interaction parameters related to OLA or SLA deadline, based on a fourth preconfigured mapping table.

15. The computer-implemented method of claim 8, wherein the customer experience is calculated by formula VIII:

$$\prod_{i=0}^{n} (\text{Customer Experience category parameter}(s))i \quad \text{(VIII)}$$

whereby:
i is a seventh interaction category that has been configured as related to customer experience, wherein the seventh interaction category parameter value is based on customer experience and its value is '1' or '0'.

16. The computer-implemented method of claim 1, wherein interactions in the interaction-queue are selected to be reordered based on the DIPS of the inbound interaction.

* * * * *